US00RE43911E

(19) United States
(12) Reissued Patent
Matsuda et al.

(10) Patent Number: US RE43,911 E
(45) Date of Reissued Patent: Jan. 8, 2013

(54) CONTROL SYSTEM FOR CHARGING BATTERIES AND ELECTRONIC APPARATUS USING SAME

(75) Inventors: Kouichi Matsuda, Kawasaki (JP); Mitsuo Saeki, Kawasaki (JP); Nobuo Tanaka, Kawasaki (JP); Hidekiyo Ozawa, Kawasaki (JP)

(73) Assignee: Fujitsu Semiconductor Limited, Yokohama (JP)

(21) Appl. No.: 10/383,068

(22) Filed: Mar. 7, 2003

Related U.S. Patent Documents

Reissue of:

(64) Patent No.: 5,739,667
Issued: Apr. 14, 1998
Appl. No.: 08/578,805
Filed: Dec. 26, 1995

U.S. Applications:

(63) Continuation of application No. 11/757,991, filed on Jun. 4, 2007, and a continuation of application No. 09/548,213, filed on Apr. 12, 2000, now Pat. No. Re. 42,114.

(30) Foreign Application Priority Data

Dec. 26, 1994 (JP) ..... 6-321970

(51) Int. Cl.
*H02J 7/24* (2006.01)
*H02J 7/04* (2006.01)

(52) U.S. Cl. ..... 320/164; 320/162

(58) Field of Classification Search ..... 320/32, 320/155–159, 162–164
See application file for complete search history.

(56) References Cited

U.S. PATENT DOCUMENTS 4,204,147 A * 5/1980 Larrabee ..... 323/257
4,384,214 A 5/1983 Crick et al.
4,455,523 A 6/1984 Koenck
(Continued)

FOREIGN PATENT DOCUMENTS

JP 57-211945 12/1982
(Continued)

OTHER PUBLICATIONS

"1996 Linear Databook vol. V", *Linear Technology*, 1996, pp. 1-37, 1-1-1-6, 2-1 and 4-370-4-387 (with index).

(Continued)

*Primary Examiner* — Richard V Muralidar
(74) *Attorney, Agent, or Firm* — Staas & Halsey LLP

(57) ABSTRACT

A control system for charging enabling efficient charging of rechargeable batteries in an electronic apparatus which charges its rechargeable batteries by using a charger circuit when driving the apparatus by using an external power source, including first detecting unit for detecting a differential value between a maximum permissible charging current allowed by the rechargeable batteries and a charging current flowing to the rechargeable batteries; second detecting unit for detecting a maximum usable current by detecting a differential value between a maximum supplyable current allowed by the external power source and the current consumption of the apparatus; third detecting unit for detecting a differential value between a maximum useable current and the charging current flowing to the rechargeable batteries; and control unit for controlling the system in accordance with the differential values detected by the first and third detecting units so that the charger circuit generates the maximum charging current within the range where the charging current flowing to the rechargeable batteries does not exceed either of the maximum permissible charging current and the maximum useable current.

19 Claims, 15 Drawing Sheets

U.S. PATENT DOCUMENTS

| | | | | |
|---|---|---|---|---|
| 4,553,081 | A | | 11/1985 | Koenck |
| 4,709,202 | A | | 11/1987 | Koenck |
| 4,716,354 | A | | 12/1987 | Hacker |
| 4,737,702 | A | | 4/1988 | Koenck |
| 4,843,299 | A | | 6/1989 | Hutchings |
| 4,845,419 | A | | 7/1989 | Hacker |
| 4,885,523 | A | | 12/1989 | Koenck |
| 4,961,043 | A | | 10/1990 | Koenck |
| 5,049,804 | A | | 9/1991 | Hutchings |
| 5,150,031 | A | | 9/1992 | James et al. |
| 5,150,032 | A | | 9/1992 | Ho |
| 5,191,277 | A | | 3/1993 | Ishikura et al. |
| 5,198,743 | A | | 3/1993 | McClure et al. |
| 5,239,495 | A | | 8/1993 | Nanno et al. |
| 5,278,487 | A | | 1/1994 | Koenck |
| 5,307,002 | A | | 4/1994 | Ho et al. |
| 5,327,071 | A | | 7/1994 | Frederick et al. |
| 5,349,282 | A | | 9/1994 | McClure |
| 5,352,970 | A | | 10/1994 | Armstrong, II |
| 5,355,073 | A | | 10/1994 | Nguyen |
| 5,363,031 | A | | 11/1994 | Miller et al. |
| 5,371,456 | A | | 12/1994 | Brainard |
| 5,382,893 | A | | 1/1995 | Dehnel |
| 5,383,140 | A | | 1/1995 | Nanno et al. |
| 5,418,445 | A | | 5/1995 | Alpert et al. |
| 5,463,305 | A | | 10/1995 | Koenck |
| 5,465,039 | A | * | 11/1995 | Narita et al. ..... 320/164 |
| 5,493,199 | A | | 2/1996 | Koenck et al. |
| 5,508,599 | A | | 4/1996 | Koenck |
| 5,523,670 | A | | 6/1996 | Ninomiya |
| 5,532,524 | A | | 7/1996 | Townsley et al. |
| 5,532,935 | A | | 7/1996 | Ninomiya et al. |
| 5,541,490 | A | | 7/1996 | Sengupta et al. |
| 5,545,969 | A | | 8/1996 | Hasegawa |
| 5,561,361 | A | | 10/1996 | Sengupta et al. |
| 5,563,496 | A | | 10/1996 | McClure |
| 5,581,772 | A | | 12/1996 | Nanno et al. |
| 5,619,117 | A | | 4/1997 | Koenck |
| 5,625,275 | A | | 4/1997 | Tanikawa et al. |
| 5,629,604 | A | | 5/1997 | Sengupta et al. |
| 5,696,435 | A | | 12/1997 | Koenck |
| 5,698,964 | A | | 12/1997 | Kates et al. |
| 5,723,970 | A | | 3/1998 | Bell |
| 5,838,141 | A | | 11/1998 | Sengupta et al. |
| 5,847,546 | A | | 12/1998 | Sengupta et al. |
| 5,856,737 | A | | 1/1999 | Miller et al. |
| 5,883,492 | A | | 3/1999 | Koenck |
| 5,883,493 | A | | 3/1999 | Koenck |
| 5,883,497 | A | | 3/1999 | Turnbull |
| 5,889,386 | A | | 3/1999 | Koenck |
| 5,939,862 | A | | 8/1999 | Kates et al. |
| 5,990,665 | A | | 11/1999 | Kawata et al. |
| 6,005,371 | A | | 12/1999 | Umetsu |

FOREIGN PATENT DOCUMENTS

| | | | |
|---|---|---|---|
| JP | 63-103627 | | 5/1988 |
| JP | 63-305721 | | 12/1988 |
| JP | 3-27413 | | 2/1991 |
| JP | 3-27414 | | 2/1991 |
| JP | 3 27416 | | 2/1991 |
| JP | 3-27417 | | 2/1991 |
| JP | 3-107339 | | 5/1991 |
| JP | 03-190537 | | 8/1991 |
| JP | 03273831 | | 12/1991 |
| JP | 03273832 | | 12/1991 |
| JP | 04150728 | | 5/1992 |
| JP | 4-178122 | | 6/1992 |
| JP | 05003633 | | 1/1993 |
| JP | 05-056566 | | 3/1993 |
| JP | 6-54466 | | 2/1994 |
| JP | 06029903 | | 2/1994 |
| JP | 6-113477 | | 4/1994 |
| JP | 6-176797 | | 6/1994 |
| JP | 6-176798 | | 6/1994 |
| JP | 6-176799 | | 6/1994 |
| JP | 7-37621 | | 2/1995 |
| JP | 7-170665 | | 4/1995 |
| JP | 7-506238 | | 7/1995 |
| JP | 10-234139 | | 9/1998 |
| JP | 10-271705 | | 10/1998 |
| WO | WO 9307557 | A1 | 4/1993 |
| WO | WO 93/19508 | | 9/1993 |

OTHER PUBLICATIONS

"Constant-Current/Constant-Voltage 3A Battery Charger with Input Current Limiting", *Linear Technology LT 1511,* Jul. 1996, pp. 1-16.

Randy Flatness et al., "New LTC 1435-LTC 1439 DC/DC Controllers Feature Value and Performance", *Linear Technology Magazine,* vol. VI, No. 1, Feb. 1996, pp. 1-40.

"1.5A and 3A Fast Charger ICs Charge All Battery Types Including Lithium-Ion", *Linear Technology Cronicle,* vol. 5, No. 3, Mar. 1996, pp. 1-4.

"3V Micropower 12-Bit A/D Converter with 4-Channel Input Multiplexer in Narrow 16-Lead Surface Mount Package", *Linear Technology Cronicle,* vol. 5, No. 5, May 1996, pp. 1-4.

"12-Bit Micropower Voltage Output Digital-to-Analog Converters in SSOP Package Have Excellent DNL", *Linear Technology Cronicle,* vol. 5, No. 6, Jun. 1996, pp. 1-4.

Carl Nelson, "Fused Lead Battery Charger ICs Need No Heat Sinks, Design Note 124", *Linear Technology Design Notes,* Mar. 1996, pp. 1-2.

Office Action mailed on Sep. 9, 2008 and issued in corresponding Japanese Patent Application No. 2008-098855.

U.S. Office Action for co-pending U.S. Appl. No. 11/757,991, mailed on Feb. 11, 2011.

U.S. Office Action for related U.S. Appl. No. 11/757,991, mailed on Mar. 9, 2012.

Notice of Allowance for related U.S. Appl. No. 09/548,213, mailed on Sep. 14, 2010.

Office Action issued Mar. 17, 2010 in related U.S. Appl. No. 11/757,991.

U.S. Office Action for co-pending U.S. Appl. No. 11/757,991, mailed on Sep. 9, 2011.

U.S. Office Action for co-pending U.S. Appl. No. 11/757,991, mailed Aug. 24, 2012.

* cited by examiner

CONTROL SYSTEM FOR CHARGING BATTERIES AND ELECTRONIC APPARATUS USING SAME

Matter enclosed in heavy brackets [ ] appears in the original patent but forms no part of this reissue specification; matter printed in italics indicates the additions made by reissue.

*Notice: More than one reissue application has been filed for the reissue parent, U.S. Pat. No. 5,739,667. The reissue applications numbers are Ser. No. 10/383,068 (the present application), Ser. No. 09/548,213 filed Apr. 12, 2000 (now RE 42,114), and Ser. No. 11/757,991 filed Jun. 4, 2007 (a continuation of Ser. No. 09/548,213).*

BACKGROUND OF THE INVENTION

1. Field of the Invention

The present invention relates to a control system for charging which enables efficient charging of rechargeable batteries, a control system for charging which enables accurate charging of the rechargeable batteries, and an electronic apparatus which enables measurement of the charging/discharging current of the rechargeable batteries by a simple configuration.

2. Description of the Related Art

A portable electronic apparatus such as a notebook computer carries batteries as the power supply for the apparatus. Generally, rechargeable batteries (rechargeable batteries) such as NiCd, NiMH (nickel metal hydride), or Li+ batteries are mounted due to the operating costs of the apparatus, the desire for an instantaneously dischargable current capacity, etc. Also, there are many examples in which a charger is built in so as to enable easy charging of the rechargeable batteries mounted inside the apparatus by just connecting an AC adapter etc. to the apparatus.

In such a portable electronic apparatus, usually the internal rechargeable batteries are used as the power supply of the apparatus, but when operating the apparatus on a desk etc., the apparatus is also operated while drawing power from an external power source through an AC adapter.

If the power which can be supplied from the AC adapter connected to the apparatus is sufficiently larger than the maximum power used by the apparatus and the maximum power necessary for the charging of the rechargeable batteries, it is possible to simultaneously operate the apparatus and charge the internal rechargeable batteries. However, where the capability of the AC adapter is smaller than this, supply of power for both of the operation of the apparatus and the charging of the internal batteries becomes impossible. Therefore, just one of them is performed in accordance with the status of use of the apparatus. AC adapters actually used for such apparatuses are limited in the amount of power which they can supply due to cost and size factors. In general, it is a rare that both operations are simultaneously carried out.

Usually, so as to minimize the cost and size of the AC adapter, generally the capability of the AC adapter is set to the larger of the maximum power necessary for the charging of the internal rechargeable batteries and the maximum power to be used by the apparatus. Also, in an apparatus designed to operate on the batteries, generally the power for charging the internal rechargeable batteries is larger than the maximum power consumption of the apparatus. This is because if the reverse were true, then the time during which the apparatus could be operated on the batteries would become shorter than the time required for charging the batteries. This would not be practical for a commercial apparatus.

In view of this situation, up until now the method has been adopted of having the charger which is mounted inside the apparatus constantly monitor the status of the apparatus and charge the rechargeable batteries when the power switch of the apparatus is turned OFF, stop the charging to the rechargeable batteries when the power switch of the apparatus has been turned ON, and restart the charging when the power switch of the apparatus is returned to the OFF position. Namely, in this configuration, the charging to the rechargeable batteries was carried out when the apparatus was not being operated and the charging to the rechargeable batteries was stopped when the apparatus was being operated.

With this setup, however, when there is excess capability of the AC adapter, efficient charging cannot be performed. Therefore, recently, the method has been adopted wherein, where the capability of the AC adapter is larger by a certain extent than the maximum power to be used by the apparatus, when the power switch of the apparatus is turned ON, the current for charging the rechargeable batteries is lowered and the charging is continued, and when the power switch of the apparatus is turned OFF, the charging is carried out by the original charging current. Namely, in this configuration, when the apparatus is not being operated, a large charging current is generated for charging the rechargeable batteries, while when the apparatus is being operated, a small charging current is generated for charging the rechargeable batteries.

In a conventional charging system having such a configuration, as will be explained in detail later with reference to the drawings, usually the completion of the charging is detected by using the "history control technique", that is, monitoring the elapse of time, and "maximum temperature control technique", that is, monitoring the maximum temperature. Between these two, the most widely used technique has been the detection of the completion of charging by monitoring the elapse of time from the start of the charging.

Further, there are sometimes demands for measurement of the discharging current of the rechargeable batteries as well in such charging processing. Conventionally, such demands have been met by the technique of preparing, separately from a first sense resistor for detecting the charging current of the rechargeable batteries, a second sense resistor for detecting the charging current of the rechargeable batteries and detecting the discharging current of the rechargeable batteries using this second sense resistor.

However, there was a problem in that efficient charging was not possible when, as in the related art, a larger of two levels of charging current was generated for charging the rechargeable batteries when the power switch of the apparatus is turned OFF and a smaller of two levels of charging current was generated for charging the rechargeable batteries when the power switch of the apparatus is turned ON.

Namely, according to this related art, the magnitude of the charging current must be set irrespective of the magnitude of the current consumed by the apparatus, so the charging current when the power switch of the apparatus is turned ON must be set to the lowest level, that is, the one for when the current consumption becomes the greatest. Due to this, there was a problem in that the charging was not performed using the capability of the external power source such as the AC adapter to the fullest extent.

Also, when the power switch of the apparatus was left in the ON position, irrespective of whether or not the apparatus was actually being operated, the rechargeable batteries were charged with a small charging current. Therefore, there was a problem that efficient charging was not performed.

If a method of detecting the completion of charging of the rechargeable batteries by monitoring the elapse of time from the start of the charging is adopted as in the related art, where the charging current generated by the charger dynamically changes, there was a problem that the completion of charging of the rechargeable batteries could not be accurately detected.

Further, if the method is adopted of preparing a sense resistor for detecting the charging current of the rechargeable batteries and a separate sense resistor for detecting the discharging current of the rechargeable batteries as in the related art, there was a problem that two sense resistors became necessary and therefore the charging/discharging current of the rechargeable batteries could not be measured by a simple configuration.

SUMMARY OF THE INVENTION

The present invention was made in consideration with this situation and has as its object to provide a novel control system for charging which enables efficient charging of rechargeable batteries, to provide a novel control system for charging which enables accurate charging of the rechargeable batteries, and to provide a novel electronic apparatus which enables the charging/discharging current of the rechargeable batteries to be measured by a simple configuration.

To attain the above object, the present invention provides a control system for charging in an electronic apparatus which charges its rechargeable batteries by using a charger circuit when driving the apparatus by using an external power source, including a first detecting means for detecting a differential value between a maximum permissible charging current allowed by the rechargeable batteries and a charging current flowing to the rechargeable batteries; a second detecting means for detecting a maximum usable current by detecting a differential value between a maximum supplyable current allowed by the external power source and the current consumption of the apparatus; a third detecting means for detecting a differential value between a maximum useable current and the charging current flowing to the rechargeable batteries; and a control means for controlling the system in accordance with the differential values detected by the first and third detecting means so that the charger circuit generates the maximum charging current within the range where the charging current flowing to the rechargeable batteries does not exceed either of the maximum permissible charging current and the maximum useable current.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Before describing the preferred embodiments of the present invention, the related art and the disadvantages therein will be described with reference to the related drawings.

Figure 13:
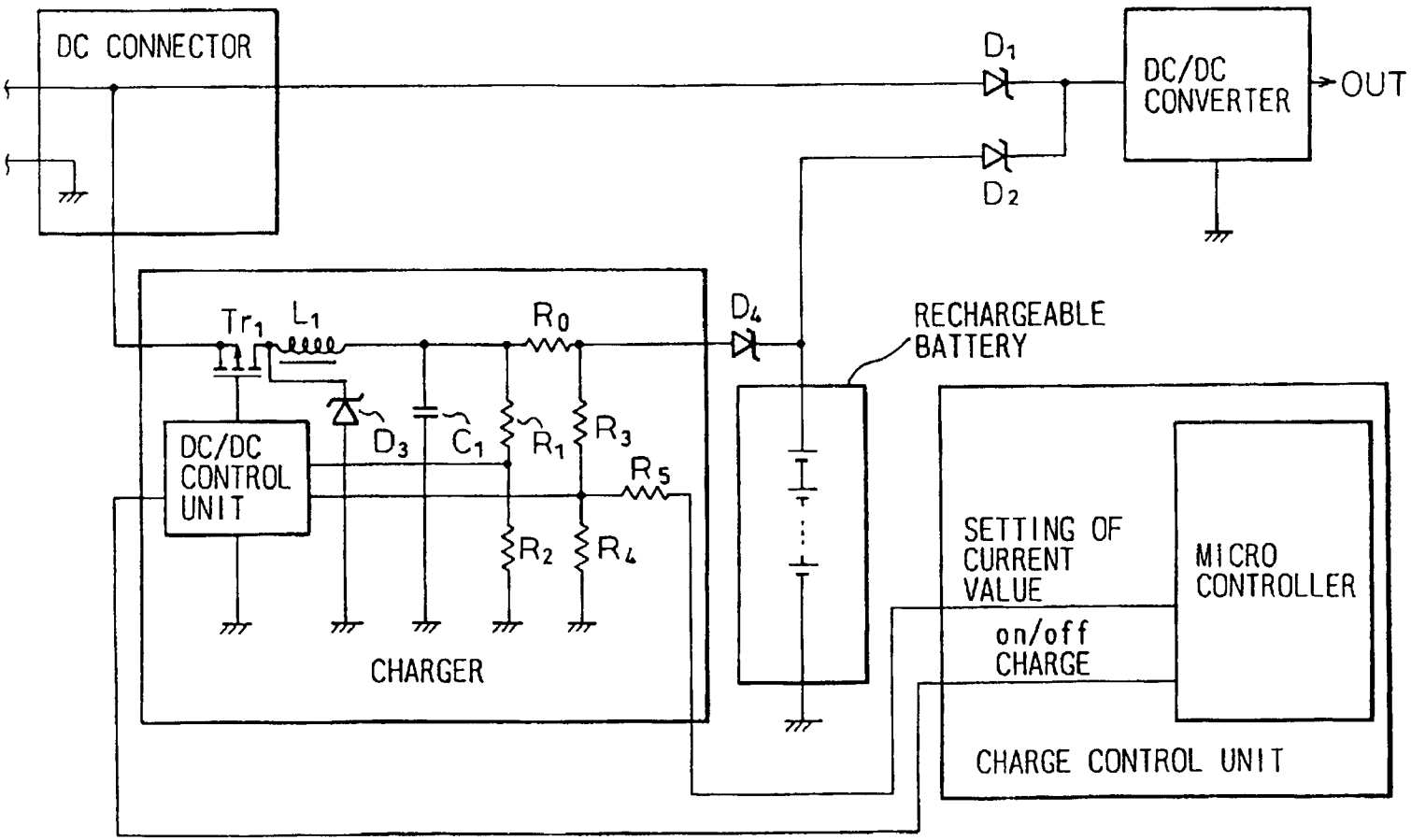
Fig.13 PRIOR ART
FIG. 13 is a view for explaining the related art.

A conventional configuration is illustrated in FIG. 13.

In the figure, the rechargeable batteries are constituted by series-connected battery cells. The DC connector is a connector for receiving power from the outside when operating the apparatus on an external power source such as an AC adapter or charging the rechargeable batteries mounted inside the apparatus by the external power source such as an AC adapter. The DC/DC converter is the power supply circuit for the apparatus which receives power from the external power source supplied via the DC connector or the rechargeable batteries and produces the voltage required by the apparatus.

The charger is a constant current source for producing the power necessary for charging the rechargeable batteries when power is supplied from the outside via the DC connector. The charging control portion is a control mechanism for controlling the start of the charging of the rechargeable batteries or end of the charging in accordance with the state of the power supply from the DC connector or the operation of the apparatus and, at the same time, for controlling the magnitude of the charging current which is generated by the charger.

$D_1$ and $D_4$ are protection diodes for preventing reverse current which prevent the flow of power from the rechargeable batteries to the outside when the AC adapter is not operating due to the fact no AC power is being supplied to the AC adapter etc. $D_2$ is a protection diode for supplying power from the rechargeable batteries to the DC/DC converter when power is not being supplied from the outside and, at the same time, preventing the supply of any voltage supplied from the outside via the DC connector to the rechargeable batteries.

The charger is a DC-DC circuit which operates under a PWM control mode. It is constituted by an ON•OFF controlled main transistor $Tr_1$ for switching, a choke coil $L_1$, a fly-wheel diode $D_3$, a smoothing capacitor $C_1$, resistors $R_0$, $R_1$, $R_2$, $R_3$, and $R_4$ for controlling the current, and a DC/DC control portion for handling constant current control processing. The resistor $R_0$ is a sense resistor for measuring the current charged to the rechargeable batteries. The voltage drop caused by this current is divided by the resistor $R_1$ and the resistor $R_2$ and, at the same time, divided by the resistor $R_3$ and resistor $R_4$ and input to the DC-DC control portion. The resistor $R_5$ is a voltage-dividing resistor for controlling the sense potential of the charging current measured by the resistor $R_0$ and switches the magnitude of the current which is generated by changing the resistance value of the resistor $R_4$ which is connected in parallel.

This charger operates so as to generate arbitrarily determined currents by the resistance values of the resistors $R_0$, $R_1$, $R_2$, $R_3$, and $R_4$. It operates under two current modes in accordance with the valid or invalid state of the resistor $R_5$ indicated by the charging control portion. This constant current operation is the same as that of a regulator of a switching mode. Here, when the microcontroller side of the resistor $R_5$ is in the open state and low level state, the resistor $R_5$ becomes valid and invalid, respectively.

When the system is constituted in this way, when power is supplied from the outside by connection of the AC adapter or the like to a DC connector, the external power is supplied to the DC/DC converter via the diode $D_1$. The DC/DC converter produces the voltage required by the apparatus in accordance with this. At this time, the external power is blocked by the diode $D_2$ from being applied to the rechargeable batteries.

On the other hand, when power is supplied from the outside, the power is supplied to the rechargeable batteries and the charging carried out only when charging has been instructed and the charger is operating. When the charger stops, the circuit is cut by the main transistor $Tr_1$ and no power is supplied to the rechargeable batteries. If the supply of power from the outside is interrupted, the power of the rechargeable batteries is supplied to the DC/DC converter via the diode $D_2$, and the DC/DC converter produces the voltage required by the apparatus in accordance with it. At this time, the power is blocked by the diodes $D_1$ and $D_4$ from flowing to the outside.

When the charger operates by the supply of power from the outside, the power produced by the charger is given to the rechargeable batteries via the diode $D_4$, whereby the rechargeable batteries are charged. At this time, the diode $D_2$ is in a backward biasing state since the voltage which is input from the DC connector is higher than the voltage of the charger. Therefore, the charging current of the rechargeable batteries will not leak to the DC/DC converter side.

During this charging processing, the charging control portion controls the ON•OFF state of the charger and controls the switching of the charging current by constantly monitoring the presence/absence of supply of power from the DC connector and the ON•OFF state of the power switch of the apparatus. Namely, when power is supplied from the outside via the DC connector, when the power switch of the apparatus is in the OFF state and thereby the apparatus is not being operated, it controls the voltage on the microcontroller side of the resistor $R_5$ so as to generate a larger of two levels of charging currents and charge the rechargeable batteries, while when the power switch of the apparatus is in the ON state and thereby the apparatus is being operated, it controls the voltage on the microcontroller side of the resistor $R_5$ to generate the smaller of the two levels of charging currents and charge the rechargeable batteries.

With such charging processing, if the charging is not terminated by accurately grasping the completion of the charging, there would be a problem of an adverse effect exerted upon the rechargeable batteries, which would lead to a reduction of the service life of the batteries. For example, if there is insufficient charging, this means that the full capacity of the batteries could not be drawn upon and the operating time of the apparatus on the batteries would be reduced. Also, in rechargeable batteries such as NiCd, NiMH, and Li+ batteries, the only problem with insufficient charging would be that the rated capacity could not be obtained, but in rechargeable batteries such as lead-acid batteries, insufficient charging would cause actual deterioration of the batteries. Also, conversely, when the charging is excessively increased so as to try to fully utilize the capacity of the batteries, the batteries become overcharged, which is a cause of deterioration of batteries.

As a means for determing when the rechargeable batteries are adequately charged, there are the method of monitoring the elapse of time from the start of the charging, the method of monitoring when the voltage of the rechargeable batteries reaches the maximum voltage value, the method of monitoring when the temperature of the rechargeable batteries reaches a maximum temperature value, the method of monitoring when the rate of temperature change of the rechargeable batteries reaches a maximum rate of temperature change, and the method of using the characteristic that the voltage of the rechargeable batteries slightly drops when charging is completed (so-called $-\Delta V$ characteristic). However, when charging over a long time, that is, charging with a small charging current in comparison with the charge capacity, control by monitoring the maximum voltage, control by monitoring the maximum rate of temperature change, and control by monitoring the $-\Delta V$ characteristic are not possible.

In view of this, conventionally, as previously mentioned, usually there is adopted the method of detecting the completion of charging by using the "history control technique" and the "maximum temperature control technique". Between these two, the former, that is, the technique of detecting the completion of charging by monitoring the elapse of time from the start of charging has been particularly widely used.

Figure 14:
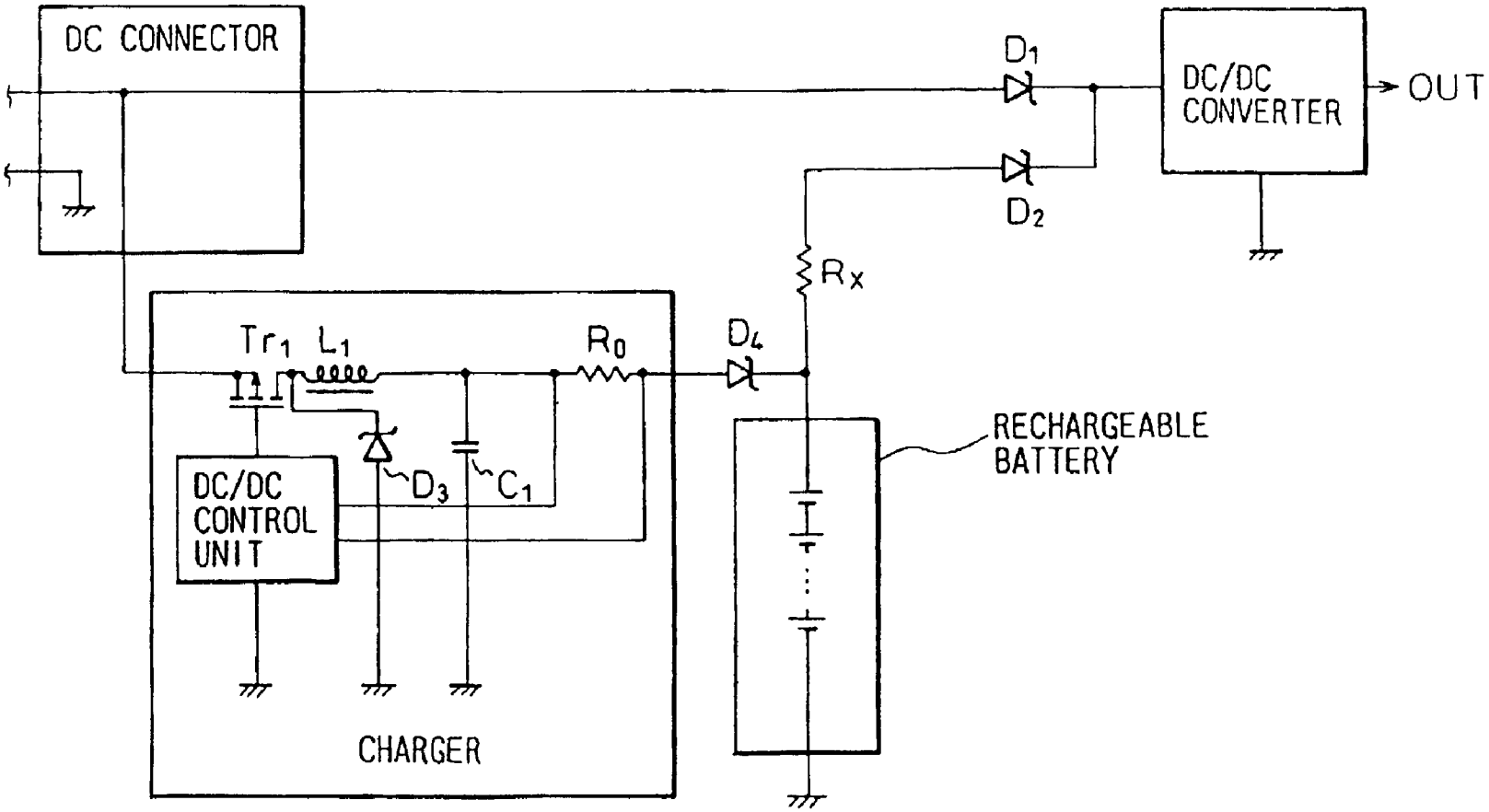
Fig.14 PRIOR ART
FIG. 14 is another view for explaining the related art.

Also, as previously mentioned, there are sometimes demands for measurement of the discharging current of the rechargeable batteries as well in such charging processing. Conventionally, as shown in FIG. 14, such demands have been met by the technique of preparing, separately from the sense resistor $R_0$ for detecting the charging current of the rechargeable batteries, a sense resistor $R_x$ for detecting the discharging current of the rechargeable batteries and detecting the discharging current of the rechargeable batteries using this sense resistor $R_x$.

The above conventional configurations, however, suffered from the problems mentioned above.

The present invention provides a novel control system for charging which enables efficient charging of rechargeable batteries, a novel control system for charging which enables accurate charging of the rechargeable batteries, and a novel electronic apparatus which enables the charging/discharging current of the rechargeable batteries to be measured by a simple configuration.

The basic configurations of the embodiments of the present invention will be illustrated in FIG. 1 through FIG. 3A and 3B.

In the figures, 1 is an electronic apparatus provided with the present invention. It is provided with a load circuit 2 for executing the signal processing, a rechargeable battery 3 for supplying power to the load circuit 2, and a charger circuit 4 for generating a charging current for the rechargeable battery 3 by using power from an external power source.

Figure 1:
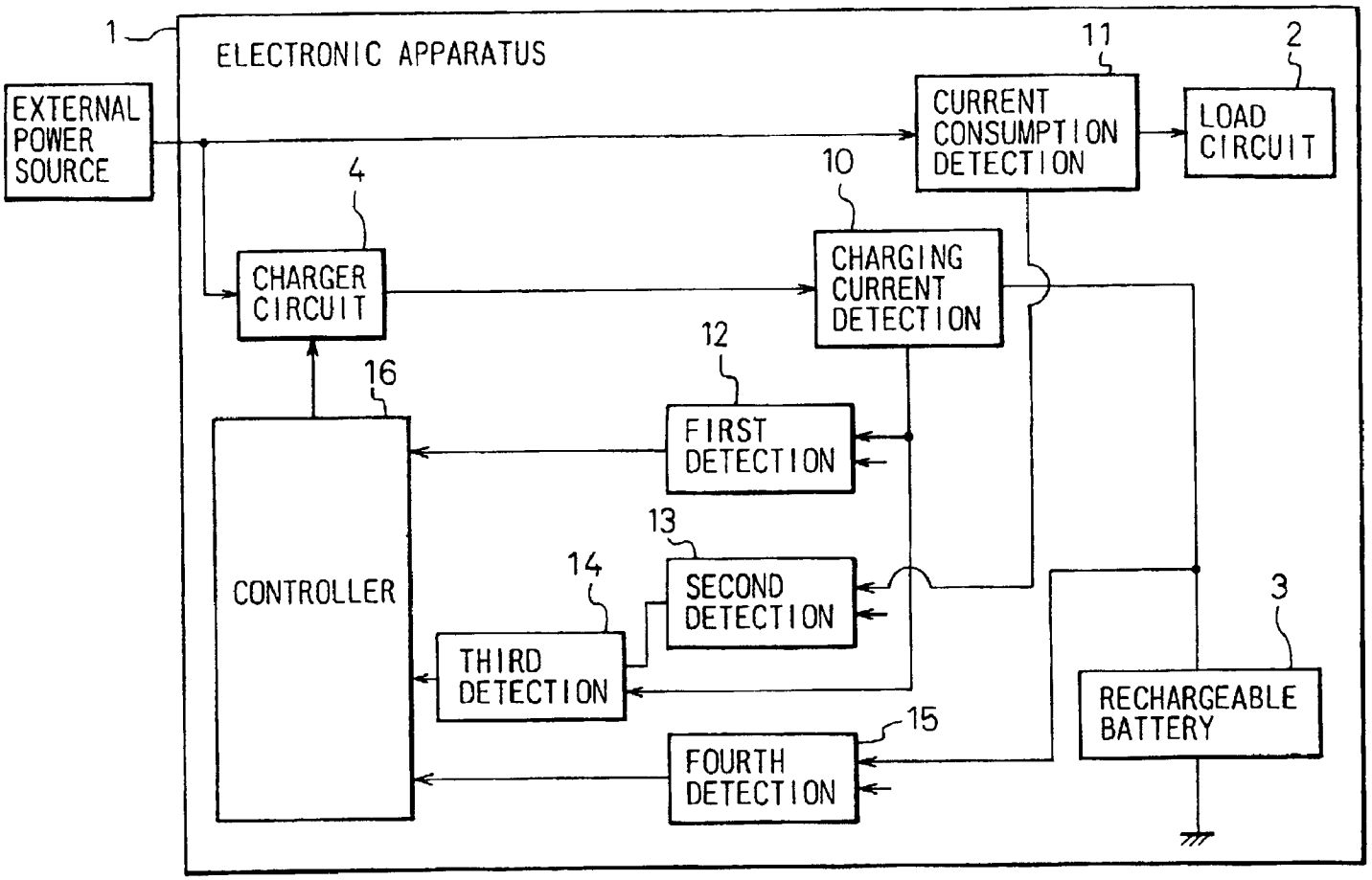
FIG. 1 is a view of the configuration of a first embodiment of the present invention.

The electronic apparatus 1 illustrated in FIG. 1 is provided with a charging current detecting means 10 for detecting the charging current flowing to the rechargeable battery 3; a current consumption detecting means 11 for detecting the current consumed by the load circuit 2; a first detecting means 12 for detecting a differential value between a maximum permissible charging current allowed by the rechargeable battery 3 and the charging current which is detected by the charging current detecting means 10; a second detecting means 13 for detecting a maximum useable current by detecting a differential value between a maximum supplyable current allowed by the external power source and the current consumption detected by the current consumption detecting means 11; a third detecting means 14 for detecting a differential value between the maximum useable current detected by the second detecting means 13 and the charging current detected by the charging current detecting means 10; a fourth detecting means 15 for detecting a differential value between the maximum permissible supply voltage allowed by the rechargeable battery 3 and the voltage applied to the rechargeable battery 3; and a control means 16 for controlling the charging current generated by the charger circuit 4.

Figure 2:
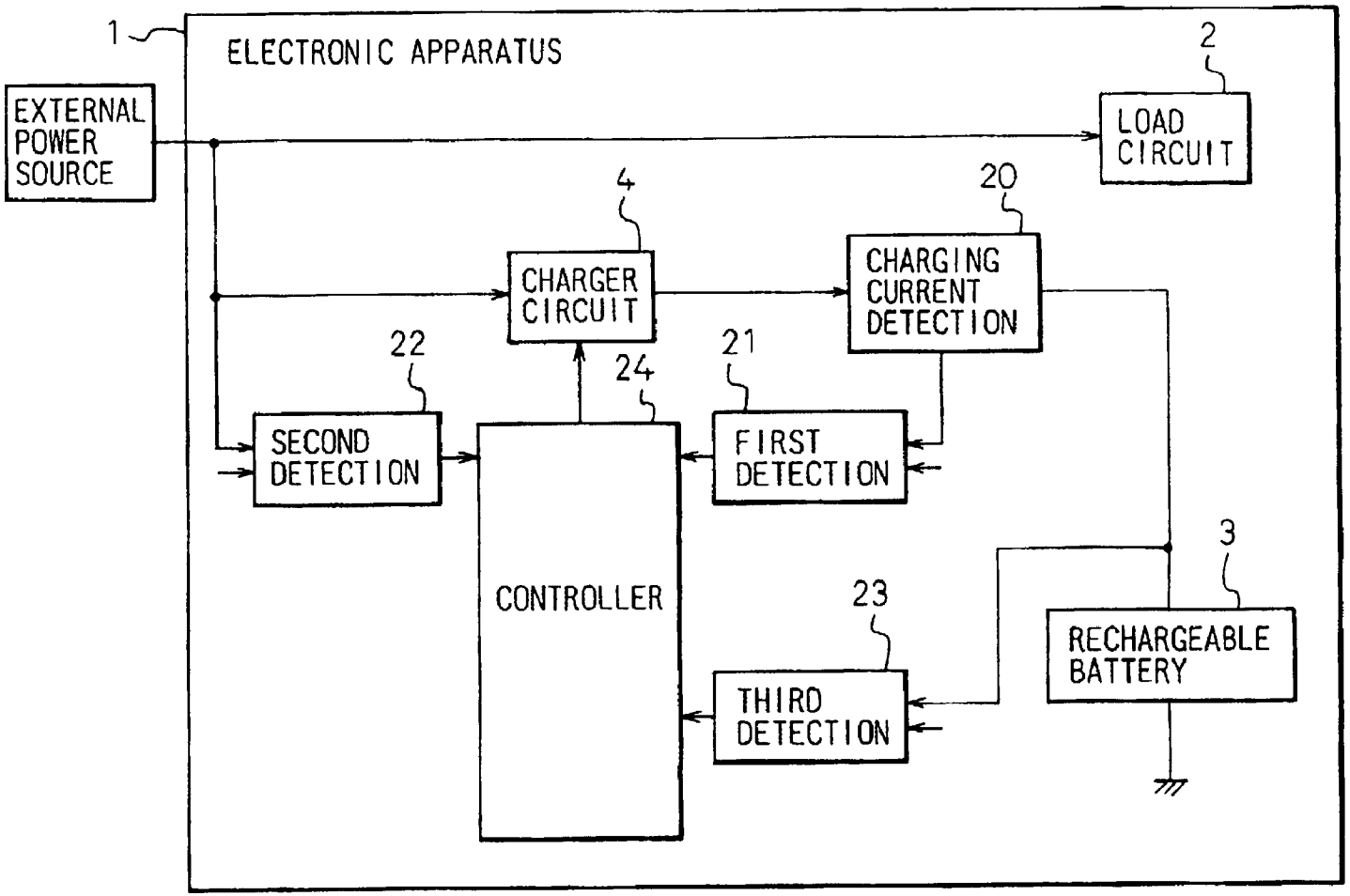
FIG. 2 is a view of the configuration of a second embodiment of the present invention.

The electronic apparatus 1 illustrated in FIG. 2 is provided with a charging current detecting means 20 for detecting a charging current flowing to the rechargeable battery 3; a first detecting means 21 for detecting a differential value between the maximum permissible charging current allowed by the rechargeable battery 3 and the charging current detected by the charging current detecting means 20; a second detecting means 22 for detecting a differential value between the lowest permissible output voltage allowed by the external power source and the voltage which is output by the external power source; a third detecting means 23 for detecting a differential value between the maximum permissible supply voltage allowed by the rechargeable battery 3 and the voltage which is applied to the rechargeable battery 3; and a control means 24 for controlling the charging current which is generated by the charger circuit 4.

Figure 3A:
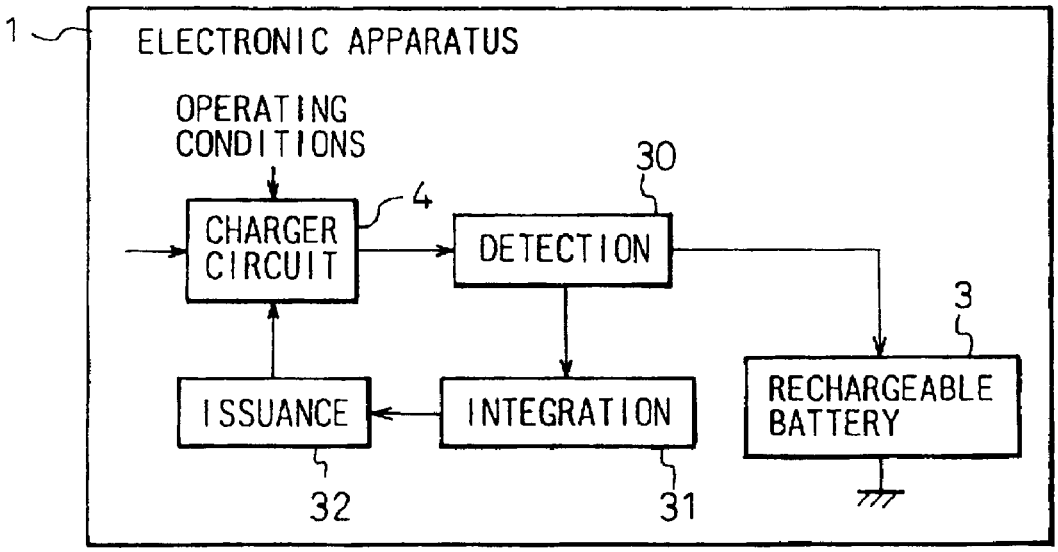
FIGS. 3A and 3B are views of the configurations of third and fourth embodiments of the present invention.

The electronic apparatus 1 illustrated in FIG. 3A is provided with a detecting means 30 for detecting the charging current flowing to the rechargeable battery 3; an integrating means 31 which integrates the charging current which is detected by the detecting means 30; and an issuing means 32 for issuing a charging end command to the charger circuit 4.

Figure 3B:
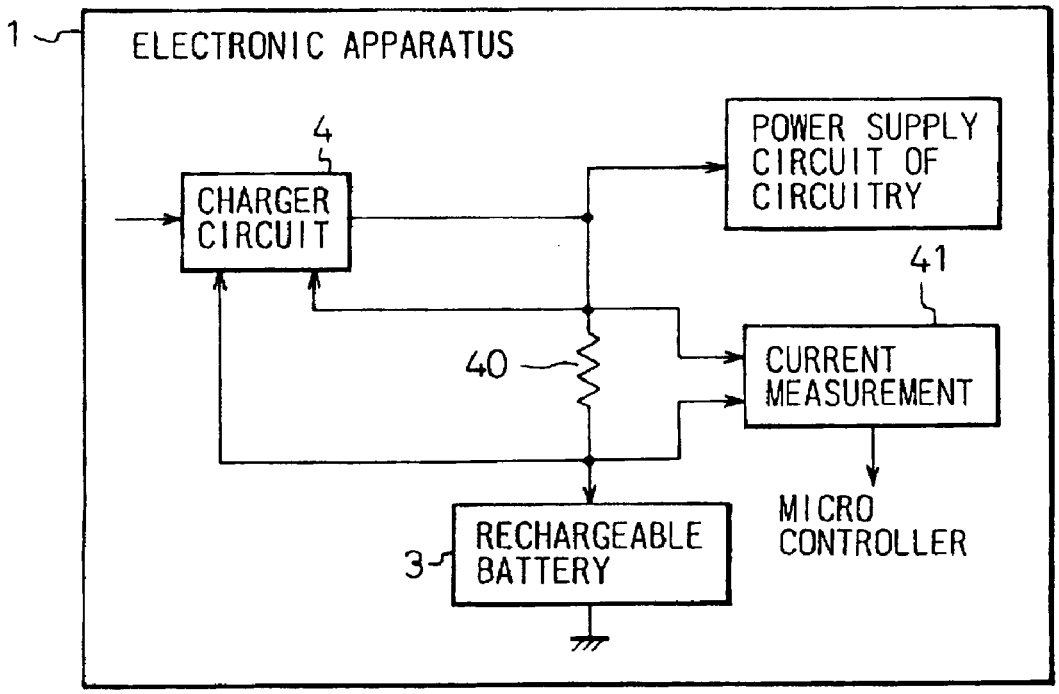

The electronic apparatus 1 illustrated in FIG. 3B is provided with a sense resistor 40 for detecting the charging current flowing to the rechargeable battery 3 on the rechargeable battery 3 side from the connection point between the charger circuit 4 and the power supply circuit of the apparatus and, at the same time, provided with a current measuring means 41 for receiving the voltages at the two ends of the sense resistor 40 as inputs, discriminating which of the two input voltages is bigger, and producing a voltage in accordance with the differential value between these two input voltages.

In the first embodiment illustrated in FIG. 1, when the apparatus is driven using power supplied from an external power source, the control means 16 performs the control according to the differential values detected by the first detecting means 12, third detecting means 14, and the fourth detecting means 15 so that the charger circuit 4 generates the maximum charging current within the range where the charging current flowing to the rechargeable battery 3 does not exceed either of the maximum permissible charging current and the maximum useable current and the voltage to be applied to the rechargeable battery 3 does not exceed the maximum permissible supply voltage.

Namely, when one or more of the differential values detected by the first detecting means 12, third detecting means 14, and the fourth detecting means 15 exceeds the limit value, the differential value which exceeds the limit value to the most extent is specified. When none exceeds the limit value, the differential value nearest zero is specified. The charging current which is generated by the charger circuit 4 is controlled so that the specified differential value becomes the zero value.

According to the control processing of this control means 16, in the first embodiment illustrated in FIG. 1, the rechargeable battery 3 is charged with the maximum charging current within a range allowed by both of the rechargeable battery 3 and the external power source, and therefore rapid charging of the rechargeable battery 3 at the time of operation of the electronic apparatus 1 becomes possible.

On the other hand, in the second embodiment illustrated in FIG. 2, when the apparatus is driven by using power given from an external power source, the control means 24 performs control according to the differential values detected by the first detecting means 21, the second detecting means 22, and the third detecting means 23 so that the charger circuit 4 generates the maximum charging current with a range where the charging current flowing to the rechargeable battery 3 does not exceed the maximum permissible charging current, the output voltage which is output by the external power source is not lowered to less than the lowest permissible output voltage, and the voltage to be applied to the rechargeable battery 3 does not exceed the maximum permissible supply voltage.

Namely, when one or more of the differential values detected by the first detecting means 21, second detecting means 22, and third detecting means 23 exceeds the limit value, the differential value that exceeds the limit value to the greatest extent is specified. When none exceeds the limit value, the differential value nearest zero is specified. The charging current which is generated by the charger circuit 4 is controlled so that the specified differential value becomes the zero value.

According to the control processing of this control means 24, in the second embodiment illustrated in FIG. 2, the rechargeable battery 3 is charged with the maximum charging current within a range allowed by both of the rechargeable battery 3 and the external power source, and therefore rapid charging of the rechargeable battery 3 at the time of operation of the electronic apparatus 1 becomes possible.

On the other hand, in the third embodiment illustrated in FIG. 3A, when the charger circuit 4 generates a charging current which changes in accordance with the operating state of the apparatus so as to charge the rechargeable battery 3, the detecting means 30 detects the charging current flowing to the rechargeable battery 3, the integrating means 31 receives this detection result and integrates the detected charging current, and the issuing means 32 receives this integration result and decides whether or not the total value of the integrated charging current and the current capacity possessed by the rechargeable battery 3 at the time of start of the charging has reached the maximum current capacity of the rechargeable battery 3 and when deciding it has, issues a command for ending the charging to the charger circuit 4.

In this way, in the third embodiment illustrated in FIG. 3A, even if the charging current generated by the charger circuit 4 dynamically changes, it becomes possible to accurately detect the completion of charging of the rechargeable battery 3 by using the charging current.

On the other hand, in the fourth embodiment illustrated in FIG. 3B, the charger circuit 4 generates a charging current of a constant current mode to be used for the charging of the rechargeable battery 3 by using the charging current detected by the sense resistor 40. In this sense resistor 40, the discharging current from the rechargeable battery 3 will also flow. The current measuring means 41 receives the charging/discharging current flowing through this sense resistor 40. When it has, for example, two input ports, the means 41 outputs a voltage in accordance with the magnitude of the charging current to one input port when the charging current flows through the sense resistor 40, and outputs a voltage in accordance with the magnitude of the discharging current to the other input port when the discharging current flows through the sense resistor 40.

In this way, in the fourth embodiment illustrated in FIG. 3B, by making joint use of one resistor for the sense resistor for the detection of the charging current and the sense resistor for the detection of the discharging current, it becomes possible to measure the charging/discharging current of the rechargeable battery 3 with a simple configuration.

Below, the present invention will be explained in further detail according to specific examples.

Figure 4:
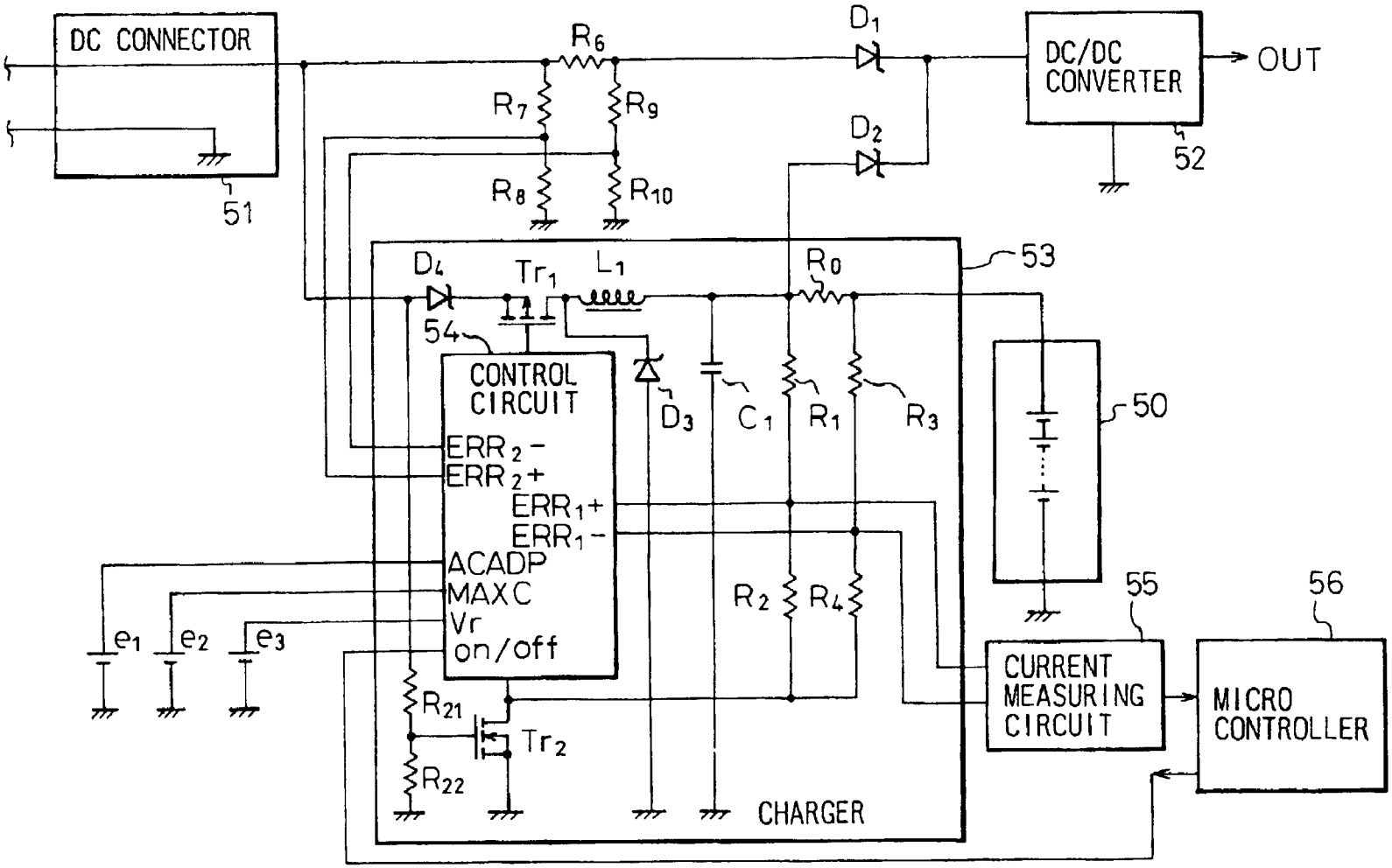
FIG. 4 shows a concrete example of the present invention.

One specific example of the present invention will be illustrated in FIG. 4.

In the figure, 50 is a rechargeable battery, that is, a rechargeable battery constituted by the series-connected battery cells; 51, a DC connector, that is, a connector for receiving power from the outside when operating the apparatus by an AC adapter or when charging the rechargeable battery 50 mounted inside the apparatus by the AC adapter; 52, a DC/DC converter, that is, a power supply circuit for the apparatus which receives the supply of power from an external power source supplied via the DC connector 51 or from the rechargeable battery 50 and thereby produces the voltage required by the apparatus; 53, a charger, that is, a constant current source for producing the power necessary for charging the rechargeable battery 50 when the power is supplied from the outside via the DC connector 51; 54, a control circuit constructed inside the charger 53, that is, a control mechanism for executing constant current control under the PWM control mode; 55, a current measuring circuit, that is, a measuring circuit for measuring the charging/discharging current of the rechargeable battery 50; and 56, a microcontroller, that is, a charging control mechanism for issuing commands for the start and end of the charging.

$D_1$ and $D_4$ are protection diodes for preventing reverse current which prevent power from flowing out from the rechargeable battery 50 to the outside when the AC adapter is not being operated due to the fact AC power is not supplied to the AC adapter etc. $D_2$ is a protection diode for supplying the power from the rechargeable battery 50 to the DC/DC converter 52 when the power is not supplied from the outside and, at the same time, for preventing the voltage from being applied to the rechargeable battery 50 when the power is supplied from the outside via the DC connector 51.

$Tr_1$ is a main transistor for switching which performs an ON/OFF operation according to the command from the control circuit 54; $L_1$, a choke coil; $D_3$, a fly-wheel diode; and $C_1$, a capacitor for smoothing.

$R_0$ is a sense resistor for measuring the charging current flowing to the rechargeable battery 50. The voltage drop due to the charging current flowing through this sense resistor $R_0$ is divided by the resistors $R_1$ and $R_2$ and, at the same time, divided by the resistors $R_3$ and $R_4$ and input to an ERR1 terminal of the control circuit 54. $R_6$ is a sense resistor for measuring the current consumed by the apparatus. The voltage drop due to the consumption of current flowing through this sense resistor $R_6$ is divided by the resistors $R_7$ and $R_8$ and, at the same time, divided by the resistors $R_9$ and $R_{10}$ and input the ERR2 terminal of the control circuit 54.

A voltage $e_1$ which is given to the ACADP-terminal of the control circuit 54 is for notifying the supplyable maximum current of the AC adapter to the control circuit 54 and is given as a voltage value corresponding to the current value. $e_2$, which is given to a MAXC-terminal of the control circuit 54, is for notifying the maximum charging current allowed by the rechargeable battery 50 to the control circuit 54 and is given as a voltage value corresponding to the current value. $e_3$, which is given to a Vr terminal of the control circuit 54, is for notifying the maximum supply voltage allowed by the battery to the control circuit 54 and is given as the voltage value.

$Tr_2$ is a switch circuit for protection for preventing the voltage of the rechargeable battery 50 from being supplied to the control circuit 54 and, at the same time, preventing the power from leaking from the rechargeable battery 50 via the resistors $R_1$ to $R_4$ by opening the ground side of the control circuit 54 when the power is not supplied from the DC connector 51. $R_{21}$ and $R_{22}$ are voltage detecting resistors for turning OFF the switch circuit $Tr_2$ when the power is not supplied from the DC connector 51 by detecting this.

Figure 5:
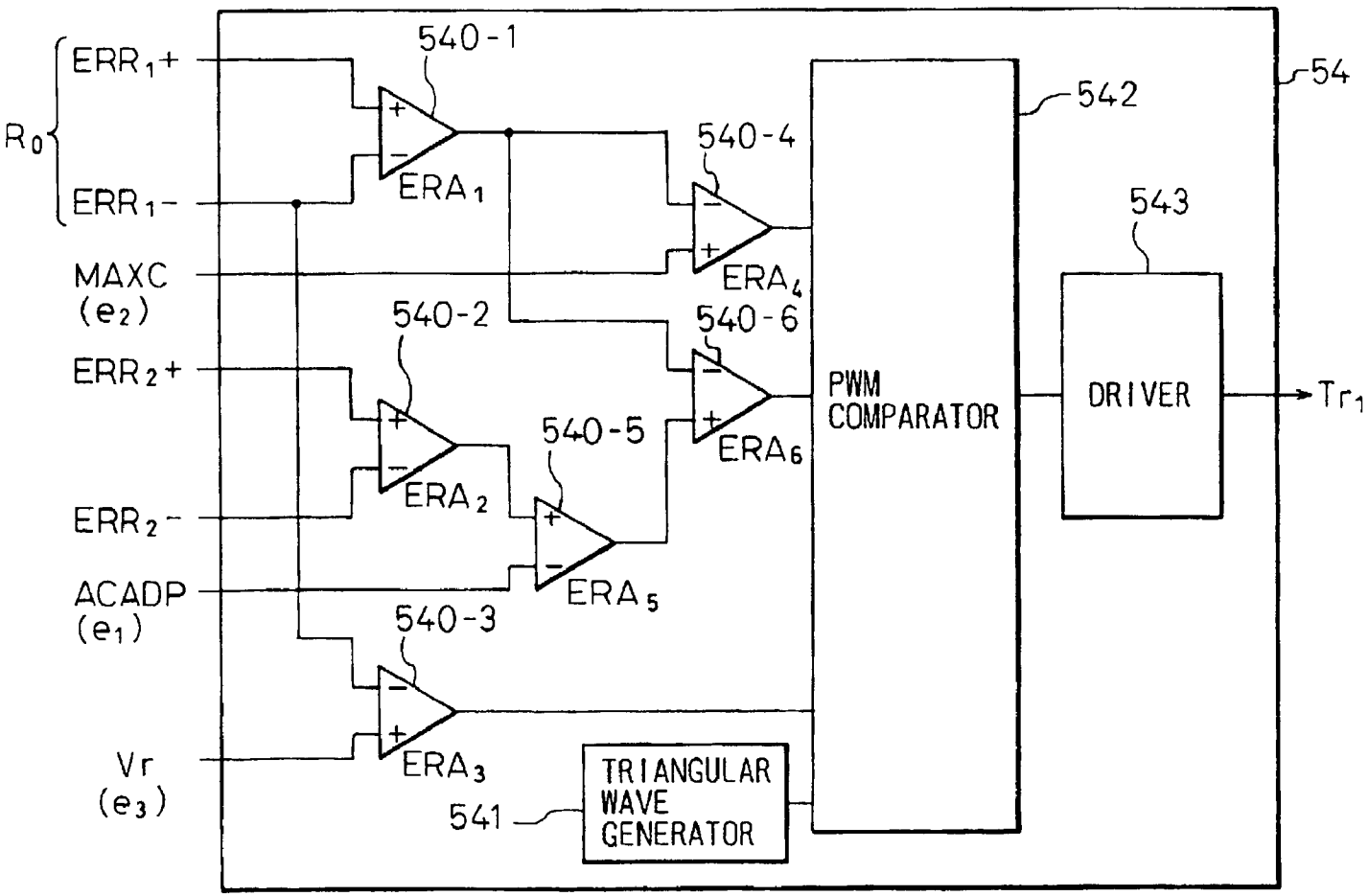
FIG. 5 shows a concrete example of a control circuit.

A concrete example of the control circuit 54 will be illustrated in FIG. 5.

As shown in this figure, the control circuit 54 is constituted by six error amplifiers 540-1 (i=1 to 6), a triangular wave generator 541, a PWM comparator 542, and a driver 543.

This first error amplifier 540-1 (ERA.) is an amplifier for measuring the voltage drop across the sense resistor $R_0$ and outputs a voltage proportional to the charging current flowing through the sense resistor $R_0$. The fourth error amplifier 540-4 ($ERA_4$) amplifies a differential value between the charging current which is output by the first error amplifier 540-1 and the maximum charging current ($e_2$) allowed by the rechargeable battery 50 to be given to the MAXC-terminal and inputs the amplified differential value to the PWM comparator 542.

The second error amplifier 540-2 ($ERA_2$) is an amplifier for measuring the voltage drop across the sense resistor $R_6$ and outputs a voltage proportional to the value of the consumption of the current flowing through the sense resistor $R_6$. A fifth error amplifier 540-5 ($ERA_5$) amplifies a differential value between the current consumption value output by the second error amplifier 540-2 and the maximum supply current value ($e_1$) supplyable by the AC adapter to be given to the ACADP-terminal and outputs the same as the maximum useable current value.

A sixth error amplifier 540-6 ($ERA_6$) amplifies a differential value between the charging current which is output by the first error amplifier 540-1 and the maximum useable current which is output by the fifth error amplifier 540-5 and inputs the same to the PWM comparator 542. A third error amplifier 540-3 ($ERA_3$) amplifies a differential value between the apply voltage to the rechargeable battery 50 which is input to the first error amplifier 540-1 and the maximum supply voltage ($e_3$) allowable by the rechargeable battery 50 which is given to the Vr terminal and inputs the amplified differential value to the PWM comparator 542.

Here, the error amplifier 540-i, receiving as its input the limit value, operates so as to output the prescribed voltage when the measured value and the limit value are equal, output a voltage larger than the prescribed voltage thereof when the limit value is larger than the measured value, and output a negative value or "0" when the measured value is larger than the limit value.

The triangular wave generator 541 produces a triangular wave voltage having a prescribed period and inputs the same to the PWM comparator 542. The PWM comparator 542 receives as its inputs the voltages output by the fourth error amplifier 540-4, sixth error amplifier 540-6, and the third error amplifier 540-3 and the triangular wave voltage output by the triangular wave generator 541 and generates a pulse having a pulse width according to the input voltage. The driver 543 is a driver circuit for driving the main transistor $Tr_1$, turns ON the main transistor $Tr_1$ during a period when the PWM comparator 542 outputs a high level and, at the same time, turns the main transistor $Tr_1$ OFF during a period when the PWM comparator 542 outputs the low level.

Figure 6:
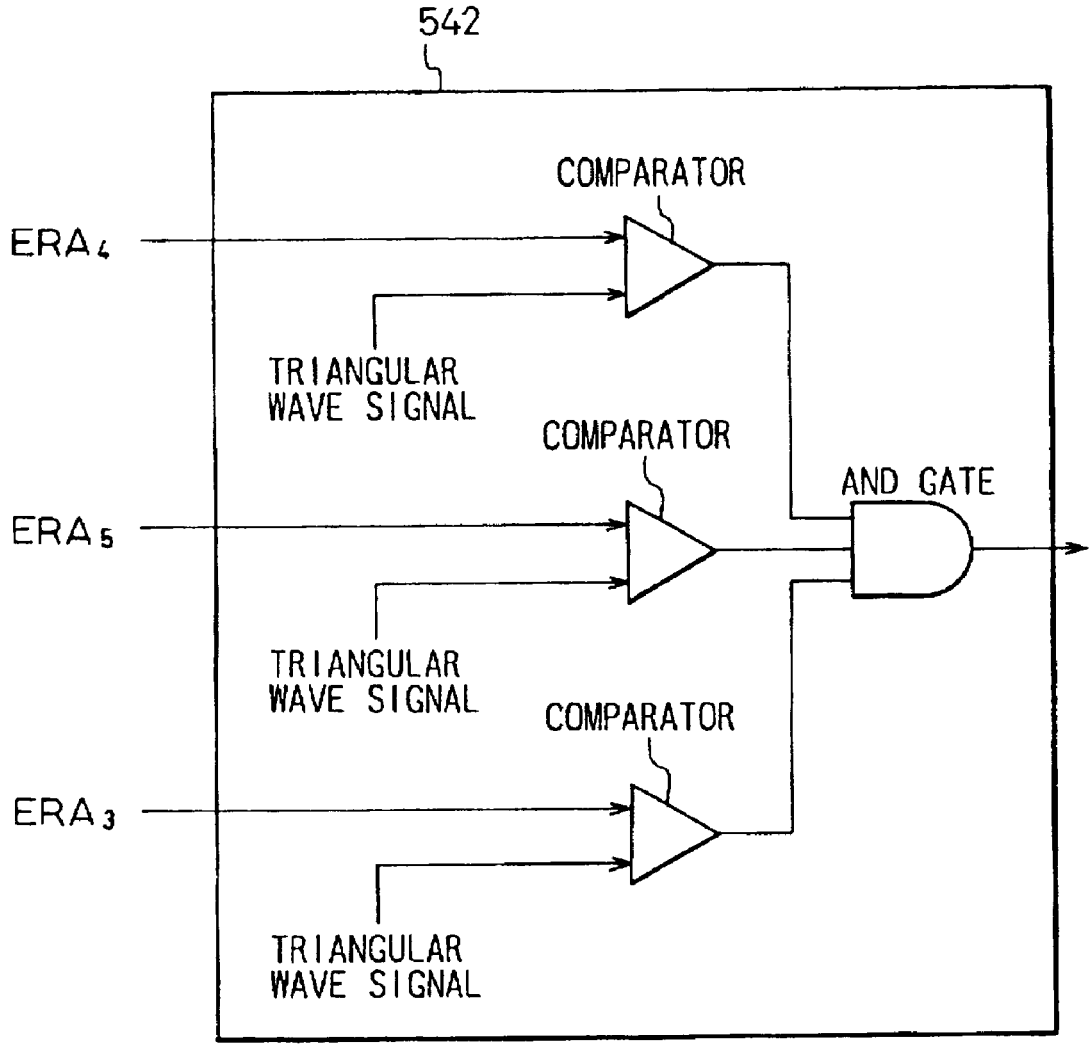
FIG. 6 shows a concrete example of a PWM comparator.

A concrete example of the PWM comparator 542 is illustrated in FIG. 6.

The PWM comparator 542 of this concrete example is constituted by comparison circuits which are provided corresponding to the input voltages from three error amplifiers, compare the output voltages of the error amplifiers and the triangular wave voltage generated by the triangular wave generator 541, and output a high level when the input triangular wave voltage is smaller, and output a low level when the input triangular wave voltage is larger; and an AND gate which calculates the AND value of the output values of all comparison circuits and outputs the resultant value. Due to this, the comparison circuits generate a pulse having a pulse width according to the output voltage of the error amplifier. The comparison circuit corresponding to the error amplifier with the measured value exceeding the limit value will operate so as not to generate a pulse since the error amplifier outputs a negative value or "0".

According to this configuration, the comparison circuits in the PWM comparator 542 produce a long pulse at a higher level as the margin is larger when the input voltage from the error amplifier is within the range of the limit value and, at the same time, do not produce a pulse when it is not within the range. The AND gate inside the PWM comparator 542 receives the outputs of the comparision circuits and outputs a pulse matching the output from the comparision circuit which outputs the highest level as shown in FIG. 7B.

Namely, the PWM comparator 542 does not generate a pulse when one of the input voltages from the three error amplifiers exceeds the limit and, at the same time, specifies the one nearest the limit value when there is no input voltage exceeding the limit value and generates a pulse of the high level having a length in accordance with this.

Responding to the generation of pulse of this PWM comparator 542, the driver 543 turns the main transistor $Tr_1$ ON during a period when the PWM comparator 542 outputs an high level, and while turns the main transistor $Tr_1$ OFF during a period when the PWM comparator 542 outputs a low level, thereby to control the magnitude of the charging current which is generated by the charger 53 so that the output voltage of the error amplifier which becomes the origin of generation of the pulse from the PWM comparator 542 becomes a zero value.

With a control circuit 54 of this configuration, the charger 53 charges the rechargeable battery 50 by a charging current limited by whichever of the charging current which is detected by the sense resistor $R_0$ (with a limit value which is the maximum charging current allowed by the rechargeable battery 50 and the maximum useable current value which is output by the fifth error amplifier 540-5) and the voltage applied to the rechargeable battery 50 (with a limit value which is the maximum supply voltage allowed by the rechargeable battery 50) reaches the limit value first.

In this way, the rechargeable battery 50 is charged by the maximum charging current within the range allowed by both of the rechargeable battery 50 and the AC adapter, and therefore it becomes possible to rapidly charge the rechargeable battery 50 at the time of the operation of the electronic apparatus 1.

Further explaining the charging operation of the concrete example of FIG. 4, since the AC adapter is connected to the DC connector 51, when power is supplied from the outside, the external power is supplied to the DC/DC converter 52 via $D_1$, and the DC/DC converter 52 produces the voltage (OUT) required by the apparatus in accordance with this.

At this time, if an instruction for charging is issued from the microcontroller 56 to the control circuit 54, the control circuit 54 starts the following operation to generate the charging current.

Namely, when current consumption through the DC/DC converter 52 is detected by the sense resistor $R_6$, the maximum useable current of the AC adapter which becomes useable in that current consumption state is found. By this, it performs control so that the charging current of the rechargeable battery 50 which is detected by the sense resistor $R_0$ does not exceed the maximum useable current value thereof and, at the same time, performs control so that the charging current thereof does not exceed the maximum charging current allowed by the rechargeable battery 50. Then, it performs control so that the voltage supplied to the rechargeable battery 50, which is detected by the sense resistor $R_0$, does not exceed the maximum supply voltage allowed by the rechargeable battery 50.

Assume that, in the embodiment of FIG. 4, the maximum charging current allowed by the rechargeable battery 50 is 1000 mA, the capacity of the rechargeable battery 50 is 1000 mAH, the maximum current supplyable by the AC adapter is 1500 mA, the maximum value of the consumption of current to be used when the apparatus operates is 1100 mA, an average value of the consumption of current to be used by the apparatus at the time of operation is 400 mA, and the current consumption when the apparatus does not operate is 0 mA. At the same time, assume that there is no limitation on the supply voltage in the rechargeable battery 50.

When the apparatus is not operating, all of the current which is supplied from the AC adapter can be used as the charging current of the rechargeable battery 50, and therefore charging at the maximum current value 1000 mA allowable by the battery becomes possible. Accordingly, the charging ends in about 1 hour at this time.

On the other hand, when the apparatus is operating, the current consumption dynamically changes in a range of from 0 to 1100 mA. In the present invention, charging will be carried out while dynamically changing the charging current in a range of from 1000 mA to 400 mA matching with this dynamic change. The average current consumption of the apparatus is 400 mA, and therefore also this charging current becomes 1000 mA on the average. This charging current of 1000 mA is a value no different from that when the apparatus is not operating. Accordingly, even if the apparatus is operating, the charging can be carried out in about 1 hour.

In this way, the present invention adopts a method of charging by the maximum capability of the AC adapter by dynamically changing the charging current of the charger 53 in accordance with the current consumption on the apparatus side by providing a function of measuring the current consumption on the apparatus side. Thus, it becomes possible to greatly shorten the charging time of the rechargeable battery 50.

Contrary to this, the related art does not adopt a configuration for dynamically detecting the dynamically changing power consumption on the apparatus side, therefore is designed considering the maximum power consumption. Due to this, when the maximum power consumption at the time of the operation of the apparatus is 1100 mA and the maximum current supplyable by the AC adapter is 1500 mA, the current value which can be used by the charger 53 becomes 400 mA. As a result, irrespective of the current consumption, the charging is always carried out at 400 mA at the time of operation of the apparatus and therefore a charging time of about 3 hours becomes possible.

In this way, in the present invention, by charging in accordance with the capability of the external power source, it becomes possible to greatly shorten the charging time of the rechargeable battery 50.

Next, an explanation will be made of the function of the current measuring circuit 55 provided in the embodiment of FIG. 4 and the microcontroller 56.

The current measuring circuit 55 is provided for measuring the magnitude of the current flowing through the sense resistor $R_0$.

This sense resistor $R_0$ acts as a resistor for controlling the constant current of the charger 53 as mentioned above, and further, as seen from the circuit configuration of FIG. 4, is provided in the path of the discharging current of the rechargeable battery 50. Namely, at the time of the charging of the rechargeable battery 50, the charging current flows through this sense resistor $R_0$, while when the AC adapter is not connected to the DC connector 51, the power of the rechargeable battery 50 is given to the DC/DC converter 52. Accordingly, the discharging current will flow through this sense resistor $R_0$. Thus, this current measuring circuit 55 will measure both of the charging current flowing to the rechargeable battery 50 and the discharging current flowing out of the rechargeable battery 50.

Figure 8:
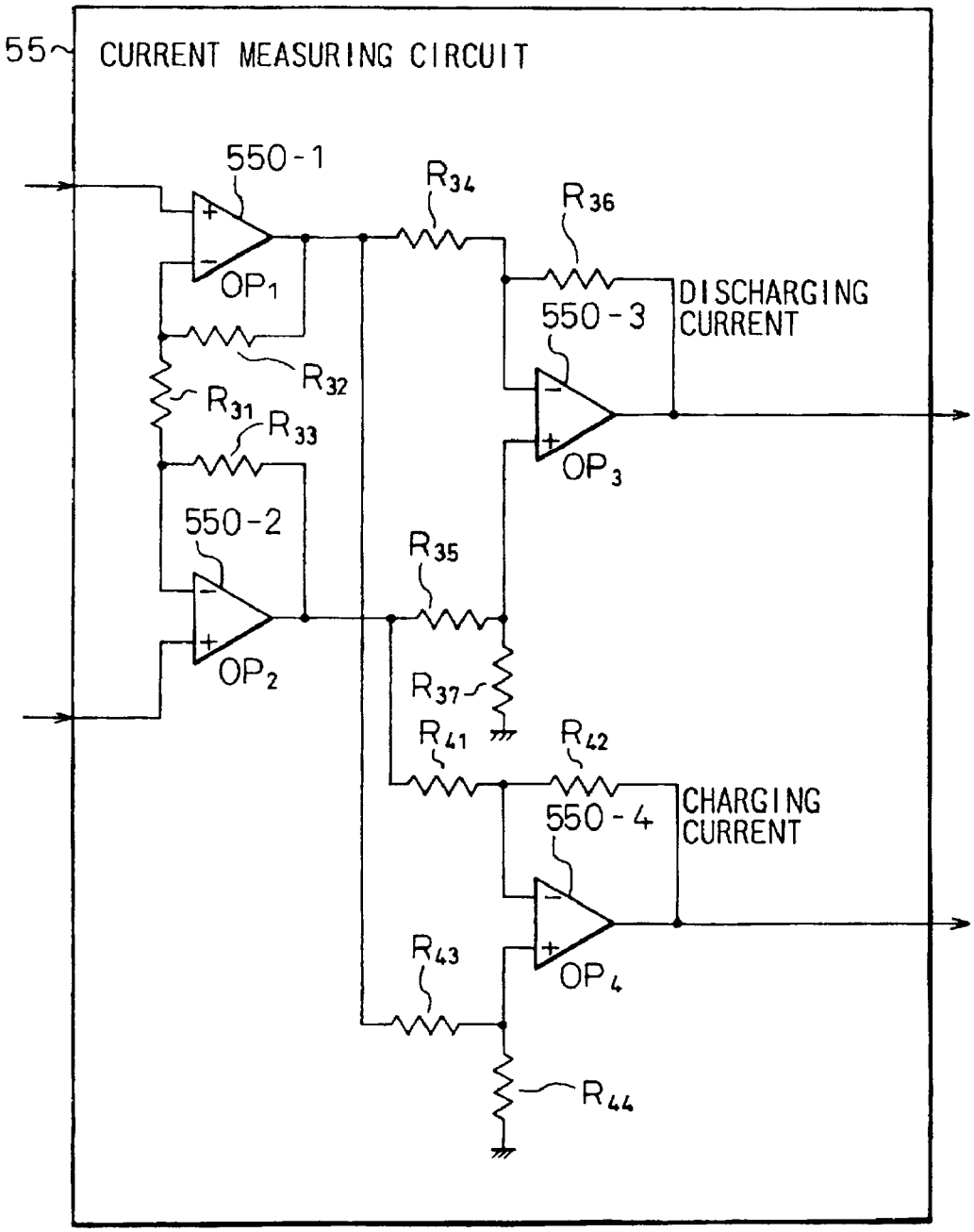
FIG. 8 shows a concrete example of a current measuring circuit.

A concrete example of this current measuring circuit 55 will be illustrated in FIG. 8.

As shown in this figure, the current measuring circuit 55 is constituted by a first operational amplifier 550-1 ($OP_1$), a second operational amplifier 550-2 ($OP_2$), a third operational amplifier 550-3 ($OP_3$) and a fourth operational amplifier 550-4 ($OP_4$). This first operational amplifier 550-1 ($OP_1$) receives as input one of the voltages of the two ends of the sense resistor $R_0$ at a plus (non-inverting) terminal, while connects the minus terminal to a minus (inverting) terminal of the second operational amplifier 550-2 via the resistor $R_{31}$. The second operational amplifier 550-2 receives as input the other voltage of the sense resistor $R_0$ at the plus terminal, while connects the minus terminal to the minus terminal of the first operational amplifier 550-1 via the resistor $R_{31}$. The third operational amplifier 550-3 receives as input the output voltage of the first operational amplifier 550-1 at the minus terminal via the resistor $R_{34}$, while connects the plus terminal to the ground via the resistor $R_{37}$. The fourth operational amplifier 551-4 receives as input the output voltage of the second operational amplifier 550-2 at the minus terminal via the resistor $R_{41}$, while grounds the plus terminal via the resistor $R_{44}$.

By this configuration, the current measuring circuit 55 amplifies a differential value between the value input to the plus terminal of the first operational amplifier 550-1 and the voltage input to the plus terminal of the second operational amplifier 550-2 and outputs the result.

Namely, the third operational amplifier 550-3 amplifies the voltage difference when the input voltage of the plus terminal of the first operational amplifier 550-1 is higher than the input voltage of the plus terminal of the second operational amplifier 550-2. Due to this, it outputs a voltage proportional to the discharging current flowing through the sense resistor $R_0$. Also, the fourth operational amplifier 550-4 amplifies the voltage difference and outputs the result when the voltage at the plus terminal of the first operational amplifier 550-1 is lower than the input voltage at the plus terminal of the second operational amplifier 550-2. Due to this, it outputs a voltage proportional to the charging current flowing through the sense resistor $R_0$.

In this way, the current measuring circuit 55 is designed to measure both of the charging current and the discharging current flowing through the sense resistor $R_0$ and discriminates whether the current flowing through the sense resistor $R_0$ is the charging current or the discharging current and produces a voltage in accordance with the magnitude of the current.

On the other hand, the microcontroller 56 performs the charging control processing by controlling the control circuit 54 in accordance with the result of measurement of this current measuring circuit 55.

Figure 9A:
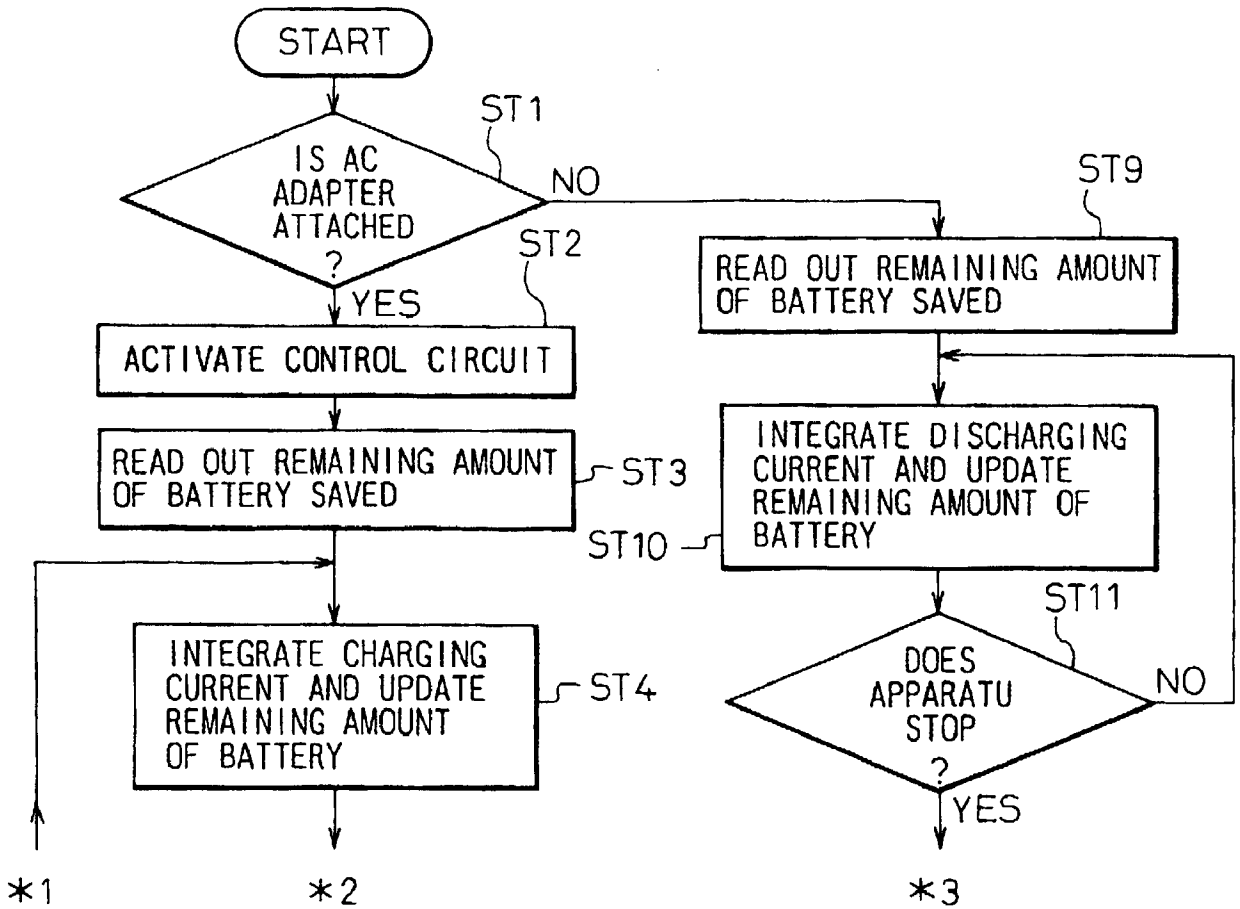
FIGS. 9A and 9B show the flow of processing to be executed by a microcontroller.
Figure 9B:
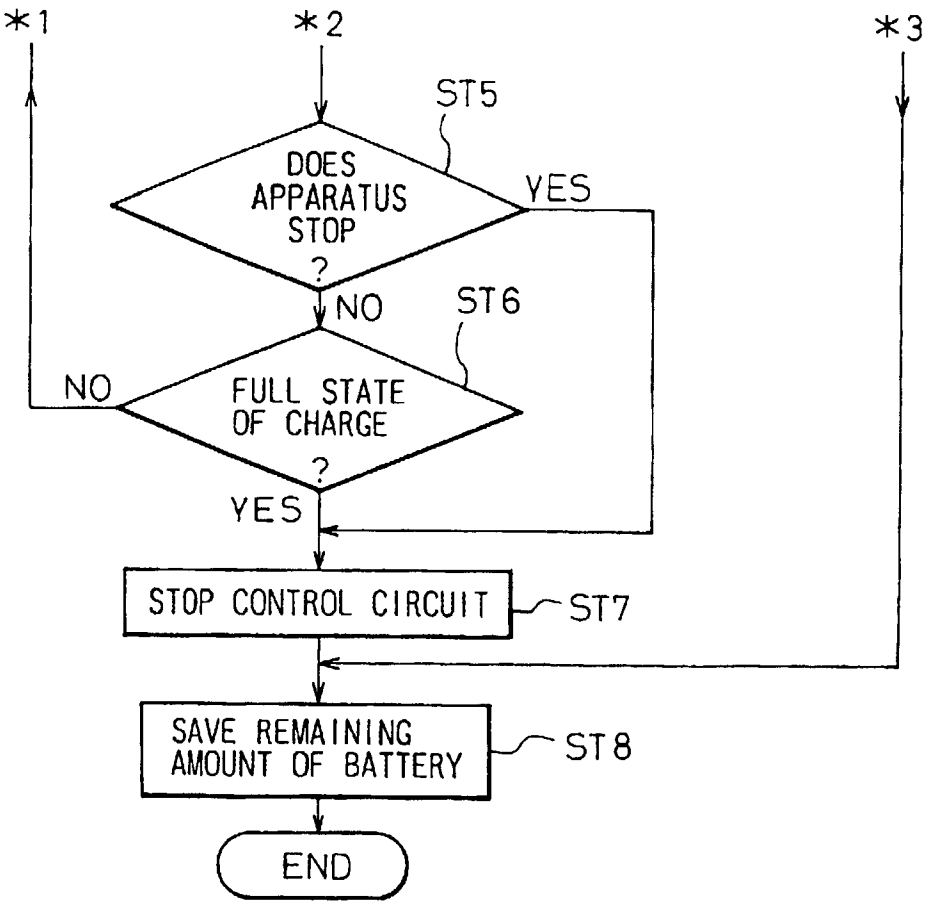

FIGS. 9A and 9B show the flow of processing executed by the microcontroller 56.

First, at step 1 (ST) as shown in the flow of processing of FIGS. 9A and 9B, the microcontroller 56 detects whether or not the AC adapter is attached. This processing is executed by monitoring the output voltage of the AC adapter although this was omitted in the embodiment of FIG. 4.

When it is detected at this step 1 that the AC adapter is attached, the processing routine goes to step 2, at which charging of the rechargeable battery 50 is indicated by activating the control circuit 54. In the subsequent step 3, the remaining amount of battery power of the rechargeable battery 50 is read out. Subsequently, at step 4, the output voltage of the current measuring circuit [50] *55* is read to read the charging current flowing through the sense resistor $R_0$ and this is integrated to update the remaining amount of battery power of the rechargeable battery 50.

Next, at step 5, it is detected whether or not an instruction for stopping the apparatus has been issued. When it is detected that no command for stopping the apparatus has been issued, the processing routine goes to step 6, at which it is decided whether or not the remaining amount of battery power has reach full charge. When it is decided that it has not reached full charge, the processing routine returns to step 4, at which the remaining amount of battery power continues to be updated. When it is decided that it has reached full charge, the processing routine goes to step 7, at which the control circuit 54 is stopped. At the subsequent step 8, the remaining amount of battery power is saved and the processing is ended.

Next, at step 5, when it is detected that an instruction for stopping the apparatus has been issued, the processing routine immediately goes to step 7, at which the control circuit 54 is stopped. At the subsequent step 8, the remaining amount of battery power is saved and the processing is ended.

On the other hand, when it is detected at step 1 that the AC adapter has not been attached, that is, when the power of the rechargeable battery 50 is supplied to the DC/DC converter 52, the processing routine goes to step 9, at which the remaining amount of battery power of the rechargeable battery 50 which has been saved is read out. Subsequently, at step 10, the output voltage of the current measuring circuit 55 is read to read the discharging current flowing through the sense resistor $R_0$ and this is integrated, thereby to update the remaining amount of battery power of the rechargeable battery 50. Subsequently, at step 11, it is detected whether or not an instruction for stopping the apparatus has been issued. When it is detected that no instruction for stopping the apparatus has been issued, the processing routine returns to step 10, at which the remaining amount of battery power continues to be updated. When it is detected that an instruction for stopping the apparatus has been issued, the processing routine goes to step 8, at which the remaining amount of battery power is saved and the processing is ended.

In this way, the microcontroller 56 stops the charging by accurately detecting the completion of charging of the rechargeable battery 50 even if the charging current which is generated by the charger circuit 53 dynamically changes.

The example of FIG. 4 adopted a configuration of inputting the maximum current supplyable by the AC adapter to the ACADP-terminal of the control circuit 54 in advance, but by utilizing the characteristic of the AC adapter, it is also possible to automatically detect the power supply capability of this AC adapter. According to this, it is possible to make the present invention further practical.

Figure 10:
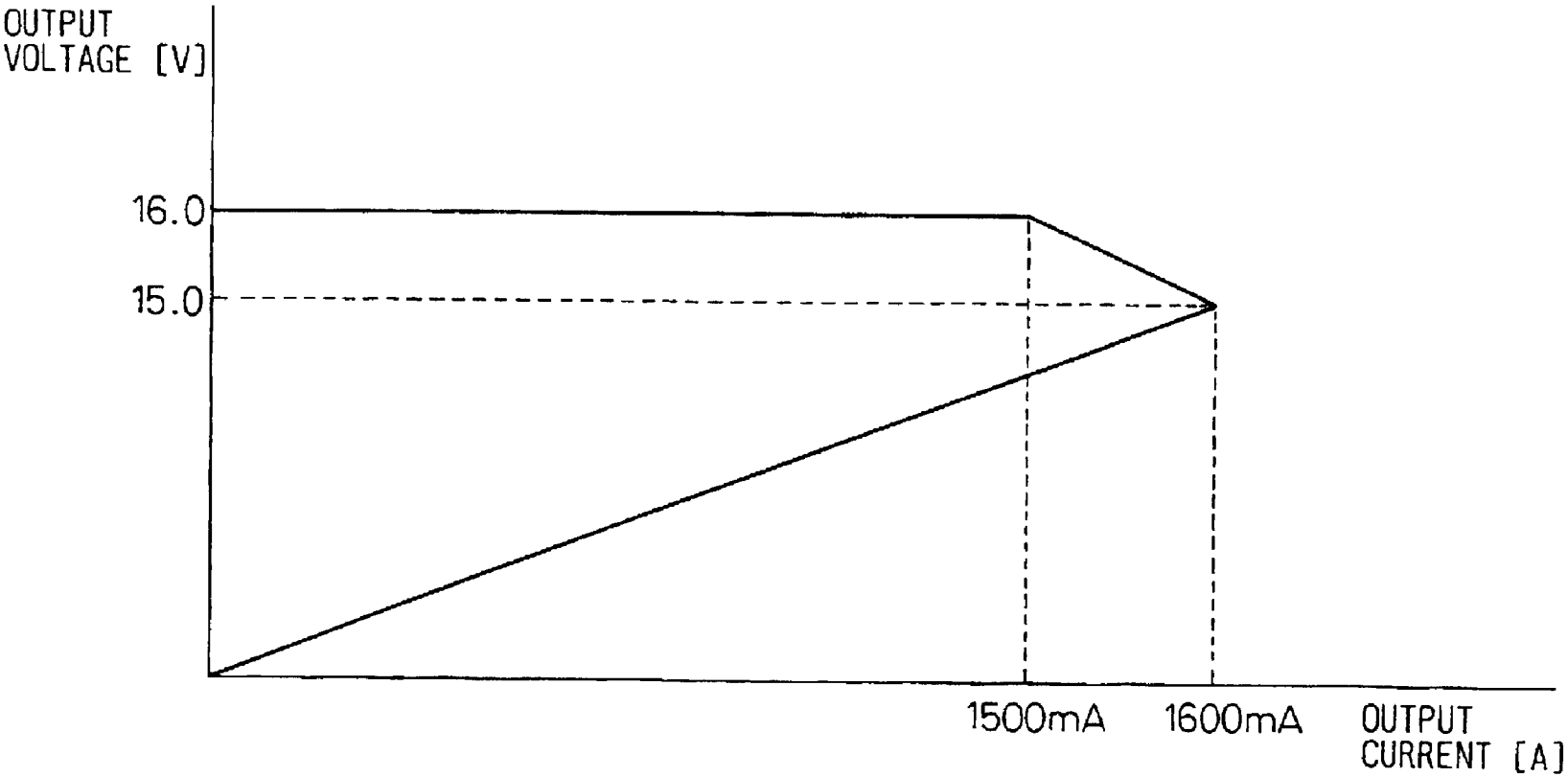
FIG. 10 is a graph of the characteristics of an AC adapter.

An example of the correspondence between the output current [A] and the output voltage [V] possessed by the AC adapter will be illustrated in FIG. 10. This shows that the AC adapter has a rated output voltage of 16.0V and a rated output current of 1500 mA.

As shown in this figure, the AC adapter maintains a voltage output of the rated output voltage when the output current is less than the rated output current, such as 0 to 1500 mA. If a current more than the rated output current is required, by lowering the output voltage to for example 15.0V, an overload state is notified to the load side. This has the function of cutting off the voltage output after the ultra-overload state is reached when a further larger current is required.

This means that, when the output voltage of the AC adapter is lowered to the prescribed lowest permissible output voltage, the limit of the power supply capability of the AC adapter is reached. By utilizing this characteristic, when the output voltage of the AC adapter is lowered to the lowest permissible output voltage, the charging current of the charger 53 is limited. This means that the maximum supply current of the AC adapter required to be originally input to the control circuit 54 can be omitted in the example of FIG. 4.

Figure 11:
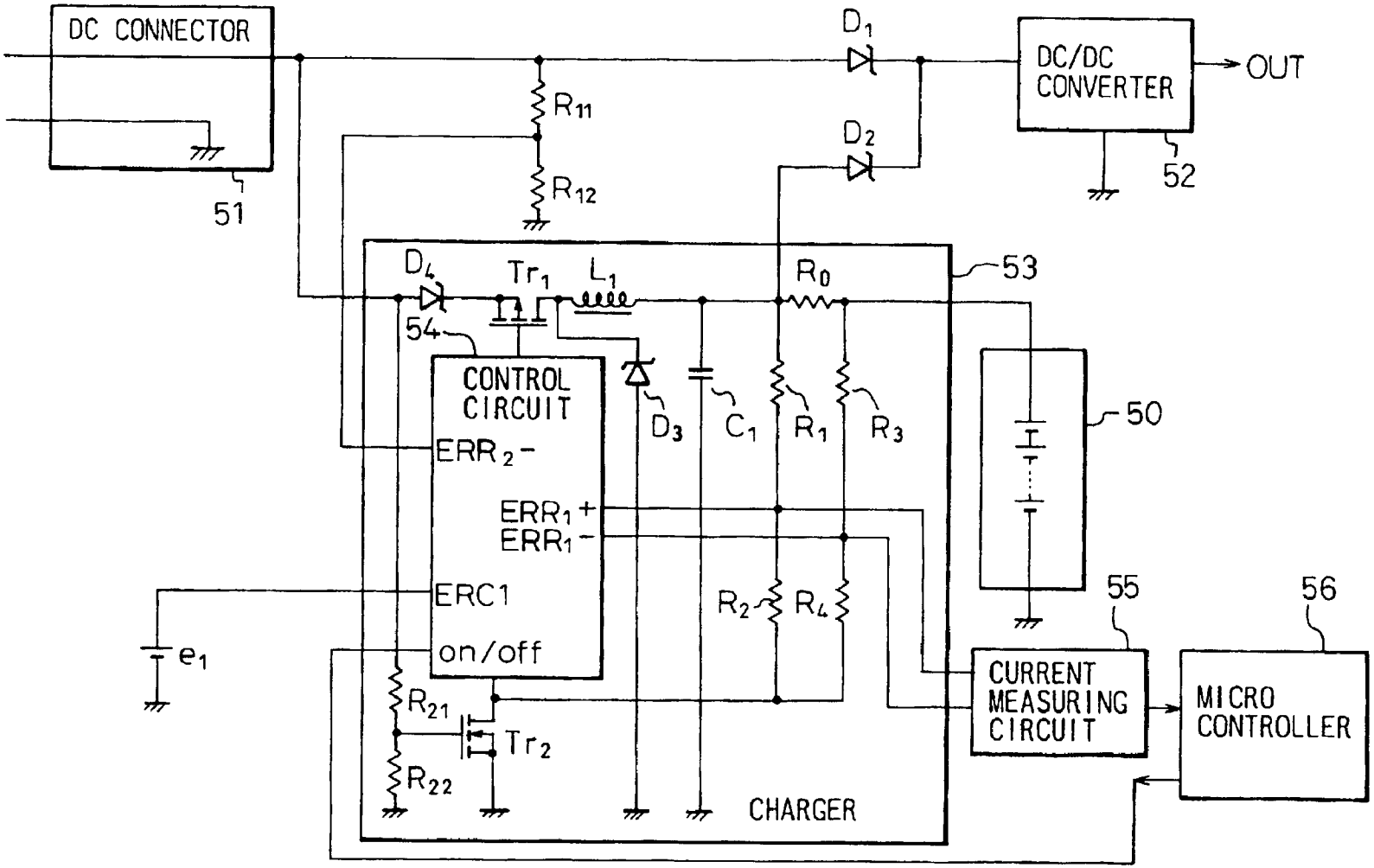
FIG. 11 shows a fifth embodiment of the present invention.

A fifth embodiment of the present invention using that method is illustrated in FIG. 11.

In the figure, the same elements as those explained referring to FIG. 4 are indicated by the same reference numerals.

The point of difference from the embodiment of FIG. 4 is that a configuration is adopted wherein the resistors $R_{11}$ and $R_{12}$ for monitoring the output voltage of the AC adapter which is connected to the DC connector 51 are provided in place of the sense resistor $R_6$ and the resistors $R_7$ to $R_{10}$ and the output voltage of the AC adapter divided by these resistors $R_{11}$ and $R_{12}$ is input to ERR2 minus terminal of the control circuit 54. Note that, the voltage $e_1$ corresponding to the maximum charging current allowable by the rechargeable battery 50 is input to the ERC1 terminal of the control circuit 54. Also, in the embodiment of FIG. 4, the maximum supply voltage allowable by the rechargeable battery 50 given from the outside is produced in an internal portion of the control circuit 54.

Figure 12:
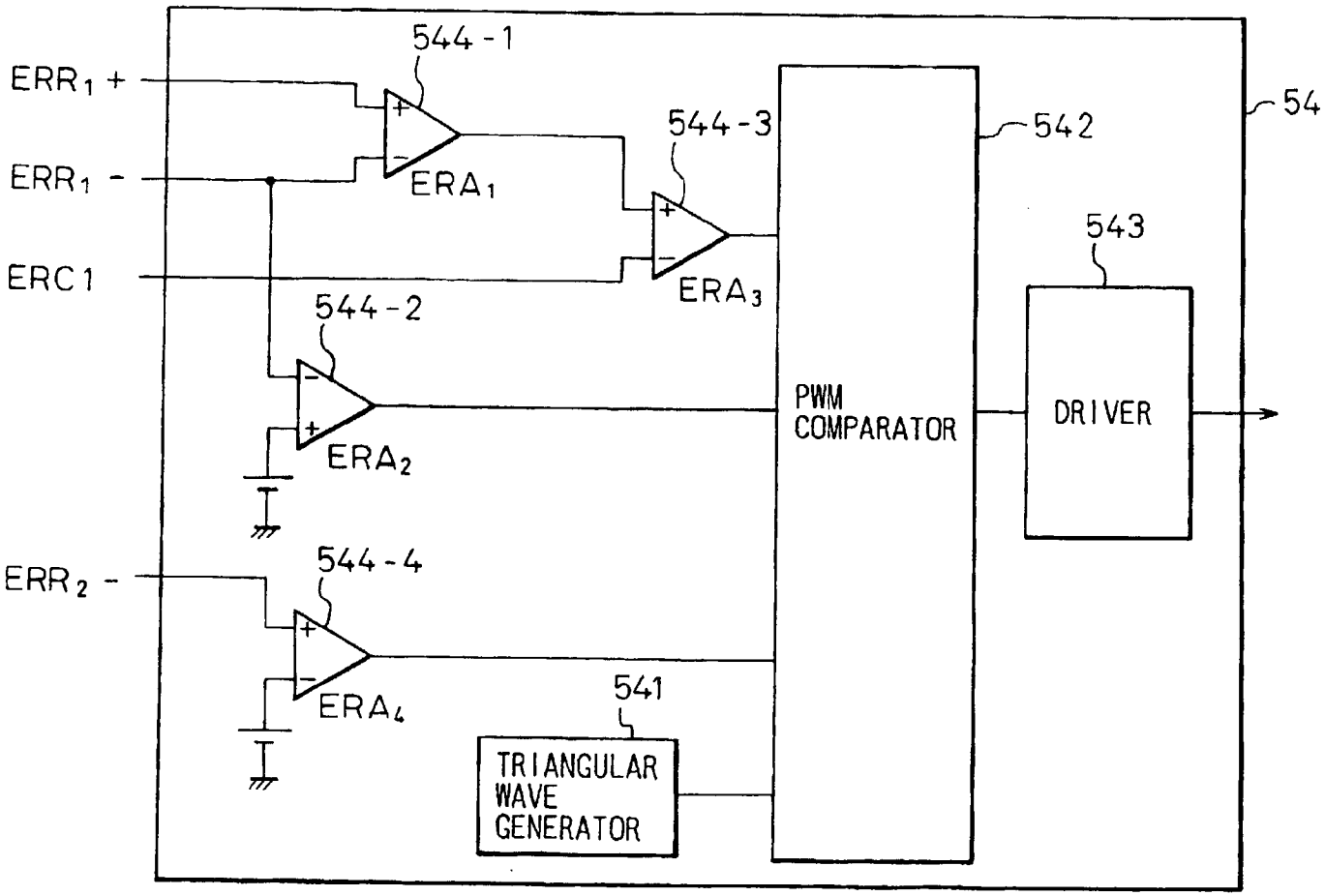
FIG. 12 shows another concrete example of the control circuit.

FIG. 12 illustrates an embodiment of the control circuit 54 used in the embodiment of FIG. 11.

As shown in this figure, the control circuit 54 used in the embodiment of FIG. 11 is constituted provided with four error amplifiers 544-i (i=1 to 4) in place of the six error amplifiers 540-i (i=1 to 6) provided in the control circuit 54 (shown in FIG. 5) used in the embodiment of FIG. 4.

This first error amplifier 544-1 ($ERA_1$) is an amplifier for measuring the voltage drop across the sense resistor $R_0$ and outputs a voltage proportional to the charging current charging current flowing through the sense resistor $R_0$. The third error amplifier 544-3 ($ERA_3$) amplifies a differential value between the charging current which is output by the first error amplifier 544-1 and the maximum charging current ($e_1$) allowed by the rechargeable battery 50 to be given to the ERC1 terminal and inputs this amplified differential value to the PWM comparator 542.

The second error amplifier 544-2 ($ERA_2$) amplifies a differential value between the voltage supplied to the rechargeable battery 50 to be input to the first error amplifier 544-1 and the maximum supply voltage value allowable by the rechargeable battery 50 which is given by the internal battery and inputs this amplified differential value to the PWM comparator 542. The fourth error amplifier 544-4 ($ERA_4$) amplifies a differential value between the output voltage of the AC adapter which is detected by the resistors $R_{11}$ and $R_{12}$ and the lowest permissible output voltage of the AC adapter which is given by the internal battery (set to for example 15.0V) and inputs this amplified differential value to the PWM comparator 542.

Responding to the voltages which are output by the third error amplifier 544-3, second error amplifier 544-2, and the fourth error amplifier 544-4 and the triangular wave voltage which is output by the triangular wave generator 541, the PWM comparator 542 generates a pulse having a pulse width dependent on the input voltage. Receiving this pulse, the driver 543 turns the main transistor $Tr_1$ ON during the period when the PWM comparator 542 outputs the high level and, at the same time, turns the main transistor $Tr_1$ OFF during the period when the PWM comparator 542 outputs the low level.

This PWM comparator 542 is constituted by comparison circuits which are provided corresponding to the input voltages from three error amplifiers similar to that explained referring to FIG. 6 and which compare the output voltages of the error amplifiers and the triangular wave voltage which is generated by the triangular wave generator 541, output the high level when the input triangular wave voltage is smaller, and output the low level when the input triangular wave voltage is higher and an AND gate which calculates the AND value of the output values of all of the comparison circuits and outputs the result. Due to this, the comparison circuits generate pulses having pulse widths in accordance with the output voltages of the error amplifiers. The comparison circuit corresponding to the error amplifier with a measured value exceeding the limit value operates so as not to generate a pulse since that error amplifier outputs a negative value or "0".

Figure 7A:
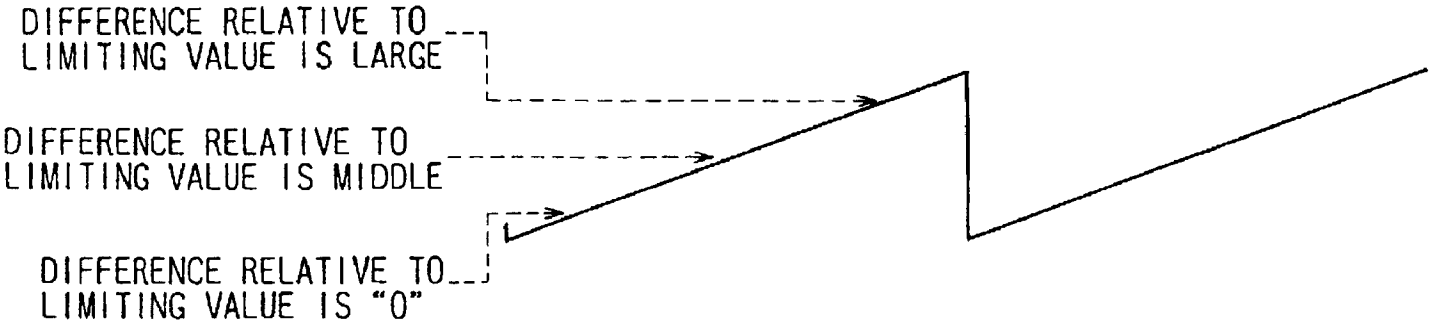
FIGS. 7A and 7B are views for explaining the operation of the PWM comparator.
Figure 7B:
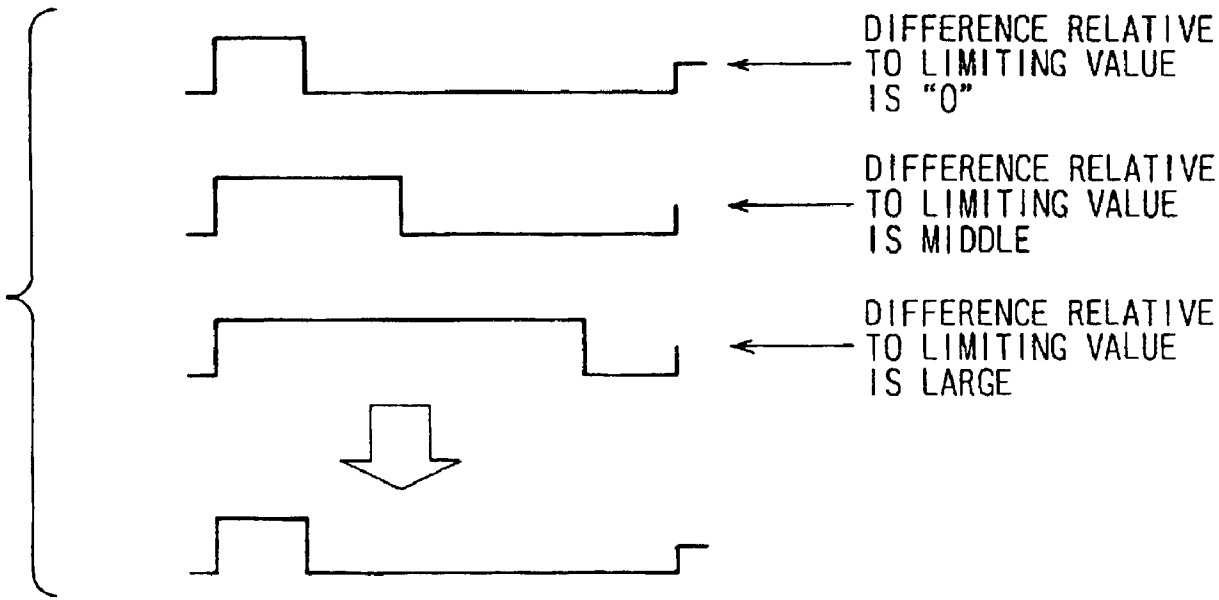

Due to this configuration, as shown in FIG. 7A, the comparison circuits in the PWM comparator 542 produce long pulses of a higher level as the margin is larger when the input voltages from the error amplifiers are within the range of the limit value and do not generate pulses when the input voltages are not within that range. The AND gate inside the PWM comparator 542 outputs a pulse matching with the output from the comparator outputting the short pulse at the highest level as shown in FIG. 7B responding to the outputs of these comparators.

Namely, the PWM comparator 542 does not generate a pulse when one or more of the input voltages from the three error amplifiers exceeds the limit value and specifies the one nearest the limit value when there is none exceeding the limit value and generates a pulse of the high level having a length in accordance with this.

Responding to the generation of pulses of this PWM comparator 542, the driver 543 turns the main transistor $Tr_1$ ON during the period when the PWM comparator 542 outputs the high level and turns the main transistor $Tr_1$ OFF during the period when the PWM comparator 542 outputs the low level. Thus, the magnitude of the charging current which is generated by the charger 53 is controlled so that the output voltage of the error amplifier which originates the pulse of the PWM comparator 542 becomes the zero value.

Due to the control circuit 54 of this configuration, the charger 53 charges the rechargeable battery 50 by a charging current limited by whichever of the charging current which is detected by the sense resistor $R_0$ (with a limit value of the maximum charging current allowed by the rechargeable battery 50), the voltage supplied to the rechargeable battery 50 (with a limit value of the maximum supply voltage allowable by the rechargeable battery 50), and the output voltage of the AC adapter which is detected by the resistors $R_{11}$ and $R_{12}$ (with a limit value of the lowest permissible output voltage of the AC adapter) first reaches the limit value. That is, the charging current which is generated by the charger 53 is not limited up to the maximum output current allowed by the AC adapter.

In this way, the rechargeable battery 50 is charged by the maximum charging current within a range allowed by both of the rechargeable battery 50 and the AC adapter, and therefore it becomes possible to rapidly charge the rechargeable battery 50 at the time of the operation of the electronic apparatus 1.

Now, in the fifth embodiment of FIG. 11, it is assumed that the maximum charging current allowable by the rechargeable battery 50 is 1000 mA, the battery capacity of the rechargeable battery 50 is 1000 mAH, the maximum current supplyable by the AC adapter is 1500 mA, the maximum value of the current used when the apparatus operates is 1100 mA, an average value of the current used by the apparatus at the time of operation is 400 mA, and the current consumption when the apparatus is not being operated is 0 mA. Also, it is assumed that there is no limitation of the supply voltage in the rechargeable battery 50.

When the apparatus is stopped, all of the current which is supplied from the AC adapter can be used as the charging current of the rechargeable battery 50, and therefore the charging at the maximum current value 1000 mA allowable by the battery becomes possible. Accordingly, the charging at this time ends in about 1 hour.

On the other hand, when the apparatus is being operated, the current consumption dynamically changes in a range of from 0 to 1100 mA. Here, however, it is assumed that the current consumption of the apparatus is 1000 mA. The charger 53 operates so as to output 1000 mA since the maximum permissible charging current of the rechargeable battery 50 is 1000 mA. However, when the charging current which is generated by the charger 53 reaches 500 mA, the negative current value of the AC adapter becomes 1500 mA, and from a point of time when exceeding this 1500 mA, the output voltage of the AC adapter starts to drop. The control circuit 54 operates so as to limit the output of the charger 53 at the point of time when the output voltage starts to be lowered by monitoring the output voltage of this AC adapter, and consequently, the charging current which is generated by the charger 53 is restricted to the value of 500 mA.

When the current consumption of the apparatus is increased and becomes 1100 mA, a voltage drop of the AC adapter occurs along with the increase of this current consumption. Therefore the charger 53 further decreases the charging current to be generated according to the command of the control circuit 54 and decreases the same down to 400 mA. Subsequently, when the current consumption of the apparatus is decreased and becomes 800 mA, the output voltage of the AC adapter returns to the rated voltage. As a result, the limitation by the output voltage of the AC adapter is released and therefore the charger 53 increases the charging current to be generated according to the command of the control circuit 54 and meets the voltage drop point of the AC adapter at the point of time when increasing the charging current to 700 mA. The current limitation starts there.

In this way, in the present invention, in accordance with the capacity of the AC adapter, the charging is carried out along with the dynamic change of the current consumption of the apparatus while dynamically changing the charging current in a range of from 1000 mA to 400 mA. The average current consumption of the apparatus is 400 mA, and therefore also this charging current becomes 1000 mA on the average. This charging current of 1000 mA is a current no different from that when the apparatus is stopped, and accordingly even if the apparatus is operating, the charging can be carried out in about 1 hour.

In this way, the present invention adopted a method wherein a function of measuring the current consumption on the apparatus side by monitoring the output voltage of the AC adapter is provided. In accordance with the current consumption on this apparatus side, the charging current of the charger 53 is dynamically changed, thereby to enable constant charging by the maximum capability of the AC adapter. Due to this, the charging time of the rechargeable battery 50 can be greatly shortened.

Contrary to this, the related art does not adopt a structure for dynamically detecting the dynamically changing power consumption on the apparatus side and therefore is designed considering the maximum power consumption. Due to this, when the maximum power consumption at the time of the operation of apparatus is 1100 mA and the maximum current supplyable by the AC adapter is 1500 mA, the current useable by the charger 53 becomes 400 mA. As a result, irrespective of any current consumption of the apparatus, at the time of the operation of the apparatus, the charging is always carried out at 400 mA, and a charging time of about 3 hours becomes necessary.

In this way, in the present invention, by performing the charging in accordance with the capability of the AC adapter, it becomes possible to greatly shorten the charging time of the rechargeable battery 50.

The present invention was explained according to the illustrated embodiments, but the present invention is not restricted to this. For example, in the concrete examples, the present invention was described by using a rechargeable battery 50 in which the supply voltage is restricted, but it is also possible to use a rechargeable battery 50 in which the supply voltage is not restricted. In this case, it is not necessary to constitute the system so as to limit the charging current by this supply voltage.

As explained above, according to the present invention, where an electronic apparatus is provided with a rechargeable battery, it becomes possible to charge the rechargeable battery by the maximum charging current within a range allowed by both of the rechargeable batteries and the external power source, and therefore it becomes possible to rapidly charge the rechargeable battery at the time of operation of the electronic apparatus.

Further, according to the present invention, even if the charging current of the rechargeable batteries dynamically changes, it becomes possible to accurately detect the completion of charging of the rechargeable batteries. Further, according to the present invention, by using the same resistor for the sense resistor for the detection of the charging current of the rechargeable batteries and the sense resistor for the detection of the discharging current of the rechargeable batteries, it becomes possible to measure the charging/discharging current of the rechargeable batteries with a simple structure.

We claim:

[1. A system for controlling the supply of power from an external power source to rechargeable batteries in an apparatus which can be powered either by the external power source or the rechargeable batteries, comprising:

a first detector for detecting a difference between a maximum permissible charging current allowed by the rechargeable batteries and a charging current flowing to the rechargeable batteries;

a second detector for detecting a maximum useable current by detecting a difference between a maximum suppliable current allowed by the external power source and the current being consumed by the apparatus;

a third detector for detecting a difference between the maximum useable current and the charging current flowing to the rechargeable batteries; and a controller for controlling power supplied from the external power source to the rechargeable batteries in accordance with the differences detected by the first and third detectors so that the charging current flowing to the rechargeable batteries does not exceed the maximum permissible charging current and does not exceed the maximum useable current.]

[2. A system for controlling as set forth in claim 1, further comprising a fourth detector for detecting a difference between a maximum permissible supply voltage allowed by said rechargeable batteries and a voltage applied to said rechargeable batteries, said control means controlling the power supplied from the external power source to the rechargeable batteries in accordance with the difference detected by the fourth detector so that the voltage applied to the rechargeable batteries does not exceed the maximum permissible supply voltage.]

[3. A system for controlling the supply of power from an external power source to rechargeable batteries in an apparatus which can be powered by either the external power source or the rechargeable batteries, comprising:

a first detector for detecting a difference between a maximum permissible charging current allowed by the rechargeable batteries and a charging current flowing to the rechargeable batteries;

a second detector for detecting a difference between a lowest permissible output voltage allowed by the external power source and an output voltage which is being output by the external power source; and a controller for controlling power supplied from the external power source to the rechargeable batteries in accordance with the differences detected by the first and second detectors so that the charging current flowing to the rechargeable batteries does not exceed the maximum permissible charging current and the output voltage being output by the external power source is not less than the lowest permissible output voltage.]

[4. A control system for controlling as set forth in claim 3, further comprising a third detector for detecting a difference between the maximum permissible supply voltage allowed by the rechargeable batteries and a voltage applied to said rechargeable batteries, said control means controlling the power supplied from the external power source to the rechargeable batteries in accordance with the difference detected by the third detector so that the voltage applied to the rechargeable batteries does not exceed the maximum permissible supply voltage.]

[5. A system for controlling as set forth in claim 1, wherein said controller controls the power supplied from the external power source to the rechargeable batteries by determining if either the first or third detector detects a negative difference thus indicating that the charging current exceeds a maximum, wherein if either of the first or third detector detects a negative difference, the controller selects the largest negative difference and controls the charging current to increase the largest negative difference to a zero difference, and wherein if neither of the first or third detector detects a negative difference, the controller selects the largest positive difference and controls the charging current to decrease the largest positive difference to a zero difference.]

[6. A system for controlling as set forth in claim 2, wherein said controller controls the power supplied from the external power source to the rechargeable batteries by determining if any of the first, third or fourth detector detects a negative difference thus indicating that the charging current or the supply voltage exceeds a maximum, wherein if any of the first, third or fourth detector detects a negative difference, the controller selects the largest negative difference and controls the charging current to increase the largest negative difference to a zero difference, and wherein if none of the first, third or fourth detector detects a negative difference, the controller selects the largest positive difference and controls the charging current to decrease the largest positive difference to a zero difference.]

[7. A system for controlling as set forth in claim 3, wherein said controller controls the power supplied from the external power source to the rechargeable batteries by determining if either of the detector detects a negative difference thus indicating that the charging current exceeds a maximum or the output voltage is less then a minimum, wherein if either of the detector detects a negative difference, the controller selects the largest negative difference and controls the charging current to increase the largest negative difference to a zero difference, and wherein if neither of the detector detects a negative difference, the controller selects the largest positive difference and controls the charging current to decrease the largest positive difference to a zero difference.]

[8. A system for controlling as set forth in claim 4, wherein said controller controls the power supplied from the external power source to the rechargeable batteries by determining if any of the detector detects a negative difference thus indicating that a current or a voltage is greater than a maximum or less than a minimum, wherein if any of the detector detects a negative difference, the controller selects the largest negative difference and controls the charging current to increase the largest negative difference to a zero difference, and wherein if none of the detector detects a negative difference, the controller selects the largest positive difference and controls the charging current to decrease the largest positive difference to a zero difference.]

[9. A system for controlling the supply of power from a charger circuit to rechargeable batteries, the rechargeable batteries being used to supply power to a power supply circuit, comprising:

a sense resistor having two ends, located between the rechargeable batteries and a connection point for the charger circuit and the power supply circuit, the sense resistor detecting current flowing into and out of the rechargeable batteries;

a current measurement device having two inputs connected respectively to the two ends of the sense resistor, the current measurement device determining which of the two inputs has a larger voltage and generating a voltage in accordance with the difference between the voltages of the two inputs to thereby measure the current flowing into or out of the rechargeable battery; and a control circuit regulating to a constant current the current flowing into the rechargeable batteries, based on the current flowing into the rechargeable batteries detected by the sense resistor.]

[10. A system for controlling as set forth in claim 9, wherein the control circuit has two inputs connected respectively to the two ends of the sense resistor.]

*11. A charge control circuit for controlling a charger for an electronic apparatus that applies an input voltage supplied from a power source to a load and has the charger for charging a battery by using the input voltage, the input voltage supplied from said power source being a substantially constant voltage for power source currents less than or equal to a predetermined value, the charge control circuit comprising:*

*a first detector which detects the input voltage from the power source;*

*a second detector which detects a difference between charging current toward the battery and a given value, the given value being a maximum permissible charging current allowed by the battery; and*

*a control circuit which reduces the charging current according to at least one of the detected input voltage and the difference detected by the second detector.*

*12. The charge control circuit as set forth in 11, wherein power applied to the load varies based on the state of the load.*

*13. A charge control circuit as set forth in claim 12, wherein the charger comprises a switch which turns charging power to the battery ON and OFF, and the control circuit controls the charging power by controlling the switch.*

*14. A charge control circuit as set forth in claim 12, wherein the control circuit controls the charging current with the second detector so that the charging current toward the battery becomes equal to or lower than said given value.*

*15. A charge control circuit as set forth in claim 12, wherein the control circuit controls the charging voltage so that a charging voltage detected by a charging voltage detector which detects the charging voltage of the battery becomes, equal to or lower than a voltage value assigned to the battery.*

*16. A charge control circuit as set forth in claim 12, wherein the power source is an AC adapter.*

*17. A charge control circuit as set forth in claim 12, wherein the power source is a power source for generating a DC voltage.*

*18. A charge control circuit as set forth in 11, wherein the input voltage decreases toward a lesser value for power source currents greater than the predetermined value, and*

*the control circuit controls the charger based on the detected input voltage value so that the input voltage does not decrease below the lesser value due to the supplying of charging power.*

*19. A charge control circuit as set forth in claim 18, wherein the charger comprises a switch which turns charging power to the battery ON and OFF, and the control circuit controls the charging power by controlling the switch.*

*20. A charge control circuit as set forth in claim 18, wherein the control circuit controls the charging current with the second detector so that the charging current toward the battery becomes equal to or lower than said given value.*

*21. A charge control circuit as set forth in claim 18, wherein the control circuit controls the charging voltage so that a charging voltage detected by a charging voltage detector which detects the charging voltage of the battery becomes equal to or lower than a voltage value assigned to the battery.*

*22. A charge control circuit as set forth in claim 18, wherein the power source is an AC adapter.*

*23. A charge control circuit as set forth in claim 18, wherein the power source is a power source for generating a DC voltage.*

*24. A charge control circuit as set forth in claim 11, wherein the charger comprises a switch which turns charging power to the battery ON and OFF, and the control circuit controls the charging power by controlling the switch.*

*25. A charge control circuit as set forth in claim 11, wherein the control circuit controls the charging current with the second detector so that the charging current toward the battery becomes equal to or lower than said given value.*

*26. A charge control circuit as set forth in claim 11, wherein the control circuit controls the charging voltage so that a charging voltage detected by a charging voltage detector which detects the charging voltage of the battery becomes equal to or lower than a voltage value assigned to the battery.*

*27. A charge control circuit as set forth in claim 11, wherein the power source is an AC adapter.*

*28. A charge control circuit as set forth in claim 11, wherein the power source is a power source for generating a DC voltage.*

*29. The charge control circuit according to claim 11, wherein*

*the control circuit reduces the charging current if the detected input voltage is decreased.*

* * * * *